(12) United States Patent
Johnson et al.

(10) Patent No.: US 9,717,172 B2
(45) Date of Patent: Aug. 1, 2017

(54) MACHINE TURN MANEUVER MANAGEMENT

(71) Applicant: AGCO Corporation, Hesston, KS (US)

(72) Inventors: Gerald R Johnson, Hesston, KS (US); Jordan Berry, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 14/799,295

(22) Filed: Jul. 14, 2015

(65) Prior Publication Data

US 2016/0037708 A1 Feb. 11, 2016

Related U.S. Application Data

(60) Provisional application No. 62/033,713, filed on Aug. 6, 2014, provisional application No. 62/033,709, filed on Aug. 6, 2014.

(51) Int. Cl.
| | |
|---|---|
| *A01B 69/08* | (2006.01) |
| *A01B 79/00* | (2006.01) |
| *A01B 69/04* | (2006.01) |
| *A01B 69/00* | (2006.01) |

(52) U.S. Cl.
CPC .......... *A01B 69/008* (2013.01); *A01B 69/004* (2013.01); *A01B 79/005* (2013.01)

(58) Field of Classification Search
CPC .... A01B 69/008; A01B 79/005; A01B 69/004
See application file for complete search history.

(56) References Cited

U.S. PATENT DOCUMENTS

| | | | |
|---|---|---|---|
| 2004/0069269 A1* | 4/2004 | Mijit | B60K 31/0066 123/352 |
| 2006/0282205 A1 | 12/2006 | Lange | |
| 2008/0191054 A1* | 8/2008 | Di Federico | A01B 79/005 239/69 |
| 2011/0022267 A1 | 1/2011 | Murphy | |
| 2011/0313647 A1* | 12/2011 | Koebler | B60L 15/2045 701/123 |
| 2013/0158772 A1 | 6/2013 | Swenson | |
| 2013/0276688 A1* | 10/2013 | Ekuni | B63H 25/04 114/162 |

(Continued)

FOREIGN PATENT DOCUMENTS

| | | |
|---|---|---|
| EP | 0821296 A2 | 1/1998 |
| EP | 2583544 A1 | 4/2013 |

OTHER PUBLICATIONS

European Patent Office, International Search Report for related European Patent Application No. 15176777.9 , dated Dec. 18, 2015.

*Primary Examiner* — Rodney Butler

(57) ABSTRACT

A control system for a mobile machine includes one or more sensors for generating machine state data and one or more computing devices. The one or more computing devices are configured to determine a first segment and a second segment of an operating path of the machine and to use the machine state data to determine an optimal speed for a turn maneuver between the first segment and the second segment of the operating path. The one or more computing devices may further be configured to determine a first optimal speed for a first portion of the turn maneuver and a second optimal speed for a second portion of the turn maneuver.

19 Claims, 21 Drawing Sheets

(56) References Cited

U.S. PATENT DOCUMENTS

2015/0094944 A1* 4/2015 Baumann ............ G05D 1/0289
  701/408
2015/0220089 A1* 8/2015 Orr ...................... A01B 79/005
  700/283

* cited by examiner

MACHINE TURN MANEUVER MANAGEMENT

CROSS REFERENCE TO RELATED APPLICATIONS

This application claims the benefit of U.S. Provisional Application Nos. 62/033,713 and 62/033,709, both filed Aug. 6, 2014, and both which are hereby incorporated by reference in their entirety.

FIELD

Embodiments of the present invention relate to path planning and automated guidance systems for mobile machines.

BACKGROUND

Mobile machines used in the agricultural and construction industries often include automatic guidance systems. Such automatic guidance systems may be configured to determine a working path through a field or other area and to guide the machine along the working path with little or no input from an operator.

When a machine is working or traversing a field or construction area it often needs to perform turn maneuvers between segments of working paths. If a machine is operating in a rectangular field, for example, it may follow a series of parallel working path segments corresponding to a center of the field and turn around in headland areas located on opposing sides of the center of the field corresponding to the ends of the working path segments.

Similarly, if a machine follows a series of non-parallel working path segments forming a contoured path, it may be necessary for the machine to execute a turn maneuver to successfully transition between consecutive path segments, particularly if an angle between the two segments is less than a minimum angle through which the machine can turn.

The above section provides background information related to the present disclosure which is not necessarily prior art.

SUMMARY

A control system according to a first embodiment of the invention comprises one or more sensors for generating machine state data and one or more computing devices. The one or more computing devices are configured to determine a first segment and a second segment of an operating path of the machine, and use the machine state data to determine an optimal speed for a turn maneuver between the first segment and the second segment of the operating path.

A control system for a mobile machine according to another embodiment of the invention comprises one or more computing devices configured to determine an optimal speed for a turn maneuver between a first segment and a second segment of an operating path, guide the machine through the turn maneuver at the optimal speed, determine an adjusted optimal speed while guiding the machine through the turn maneuver, and adjust the speed of the machine during the turn maneuver to match the adjusted optimal speed.

A control system for a mobile machine according to another embodiment of the invention comprises one or more sensors for generating machine state data and one or more computing devices. The one or more computing devices are configured to determine a first segment and a second segment of an operating path of the machine, and determine an optimal speed for a turn maneuver between the first segment and the second segment of the operating path, the optimal speed based at least in part on a state of the machine or a state of an implement pulled by the machine.

These and other important aspects of the present invention are described more fully in the detailed description below. The invention is not limited to the particular methods and systems described herein. Other embodiments may be used and/or changes to the described embodiments may be made without departing from the scope of the claims that follow the detailed description.

DRAWINGS

Embodiments of the present invention are described in detail below with reference to the attached drawing figures, wherein.

FIGS. 10A-G illustrate various exemplary turn maneuvers executed between working path segments.

Figure 11:
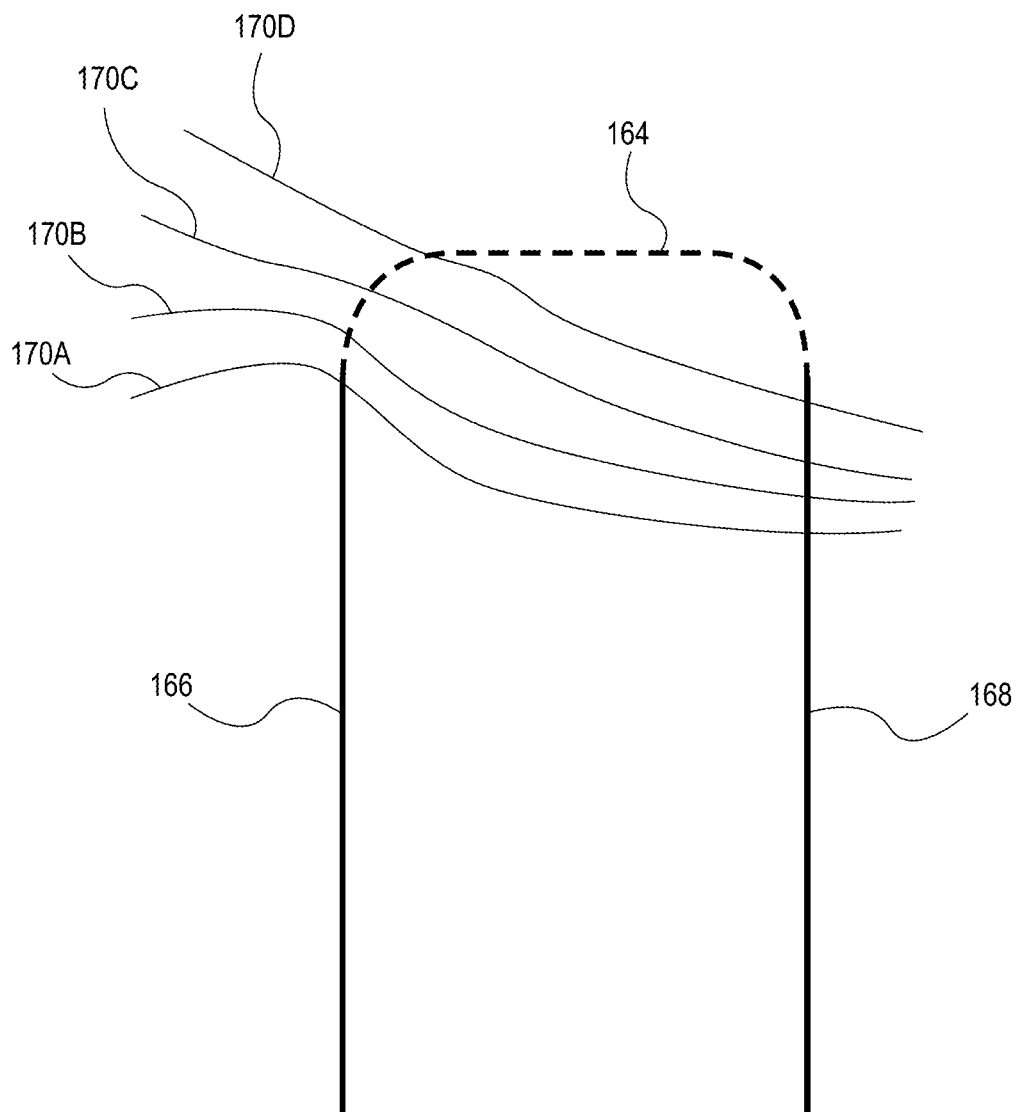

FIG. 11 illustrates an exemplary turn maneuver executed between working path segments, and further illustrates changes in elevation of the ground through which the turn maneuver is executed.

Figure 12:
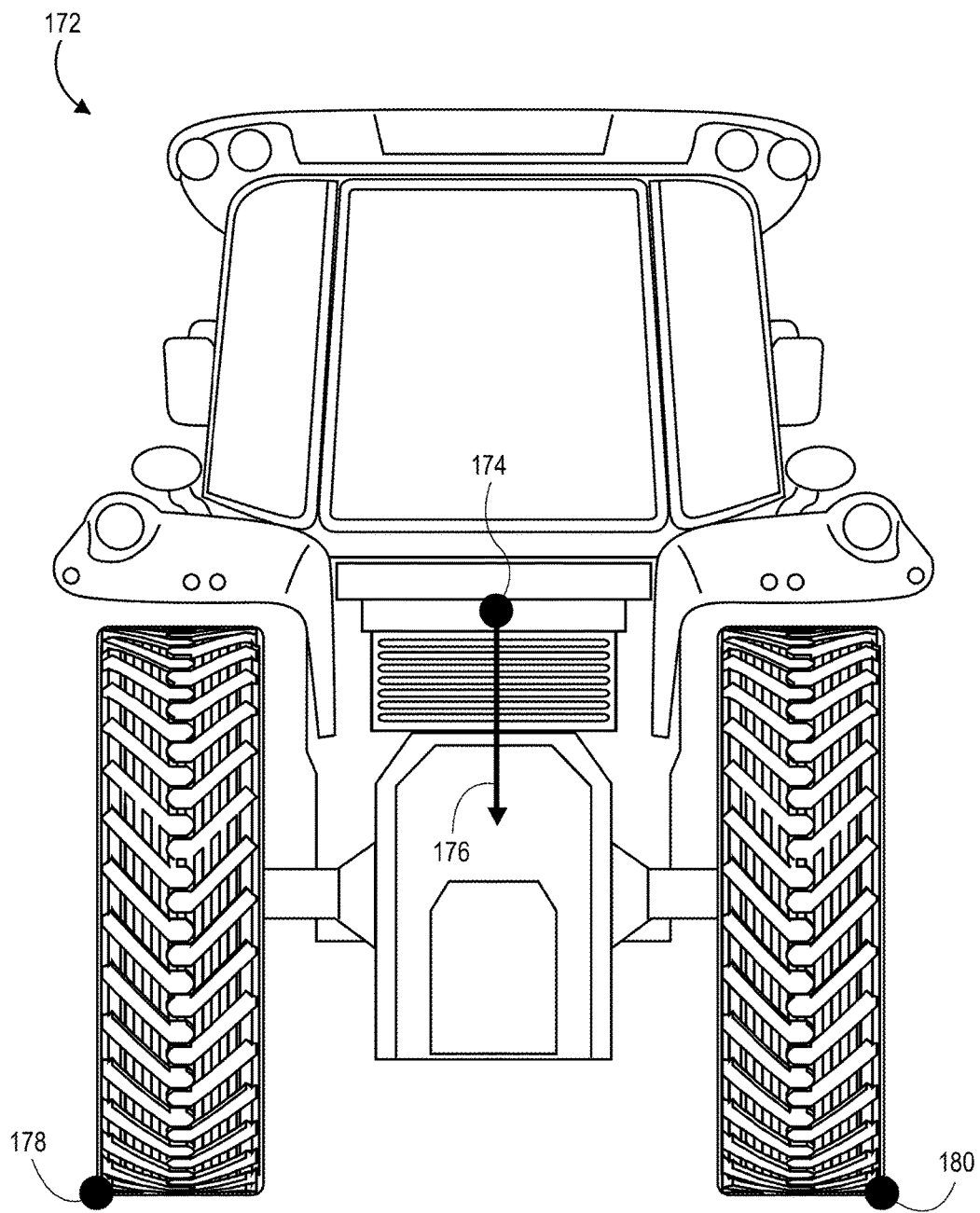

FIG. 12 is a rear elevation view of a tractor illustrating the positions of a center of gravity and a plurality of tipping axes associated with the tractor.

Figure 13:
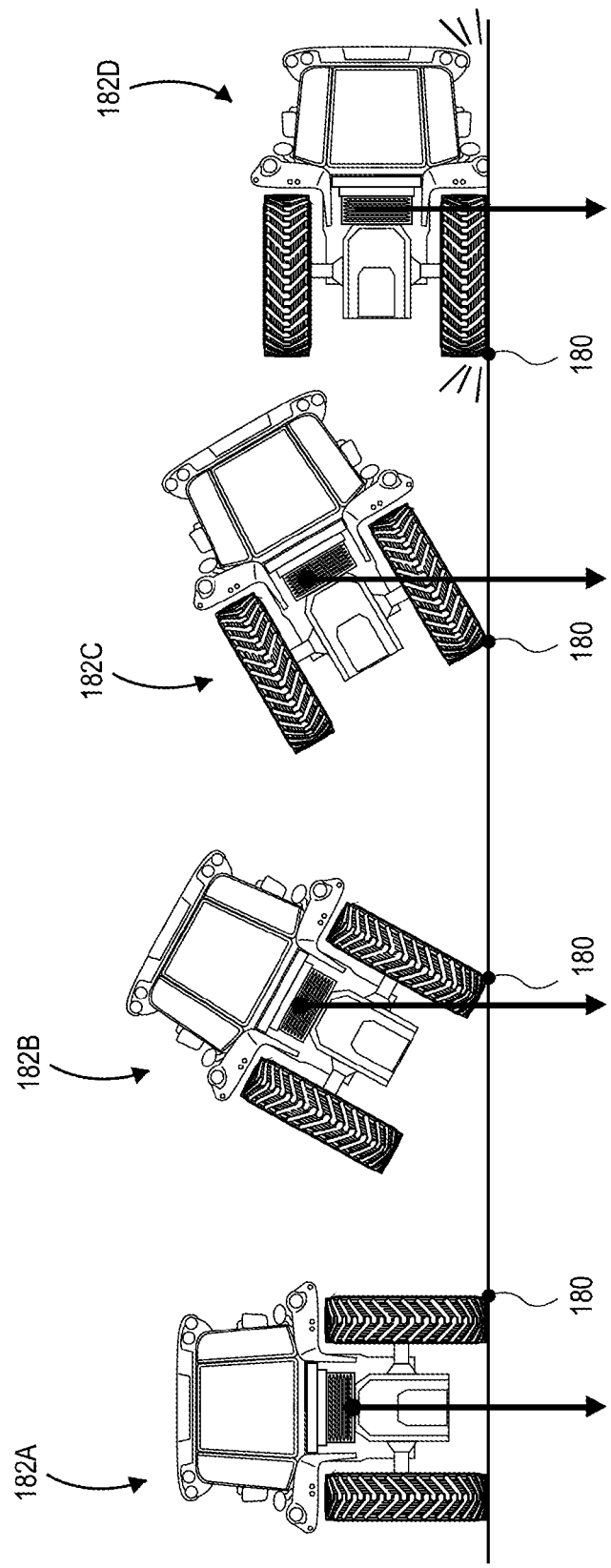

FIG. 13 illustrates the tractor of FIG. 12 in various positions relative to a ground surface representing tipping action of the tractor.

Figure 14:
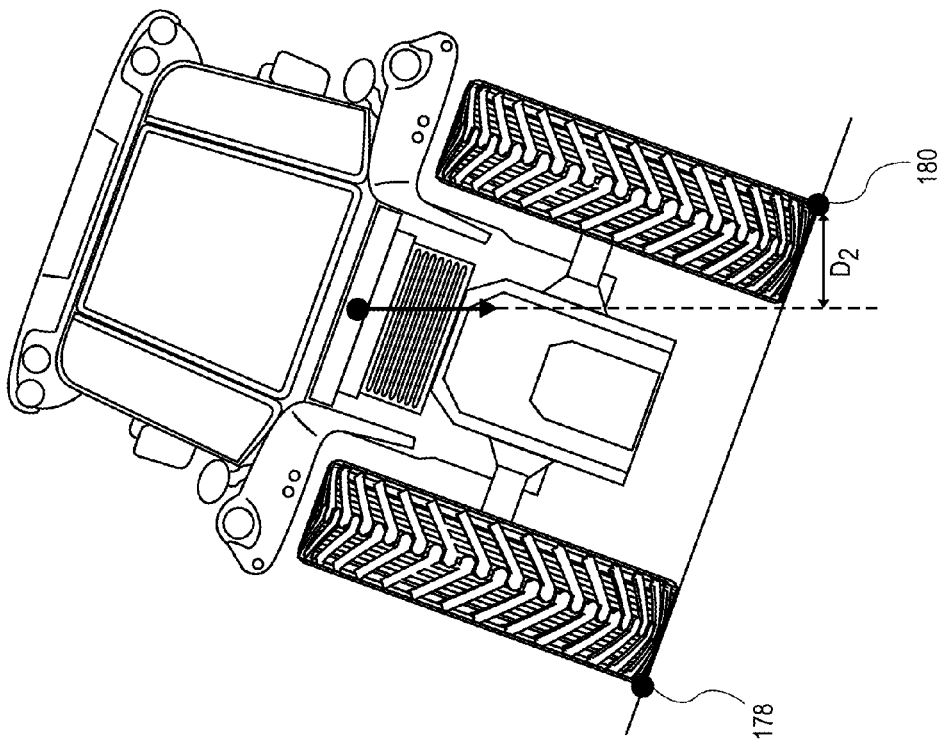

FIG. 14 illustrates the relative positions of a tipping axis and a center of gravity of the tractor of FIG. 12 with the tractor on an inclined ground surface.

Figure 15:
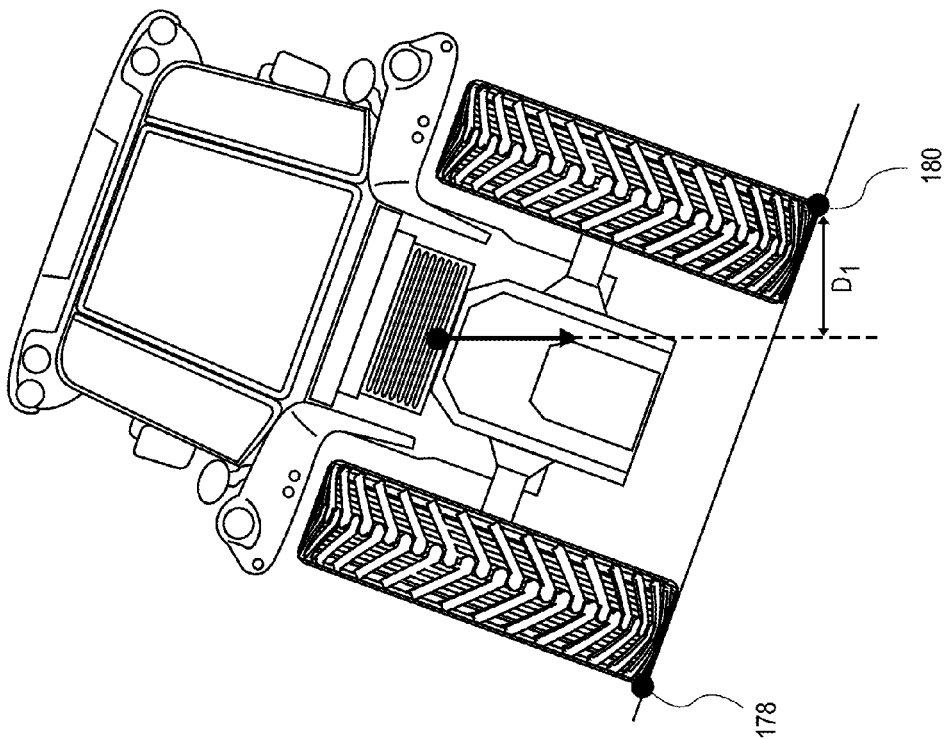

FIG. 15 illustrates the relative positions of a tipping axis and a center of gravity of the tractor of FIG. 12 with the tractor on an inclined ground surface.

Figure 16A:
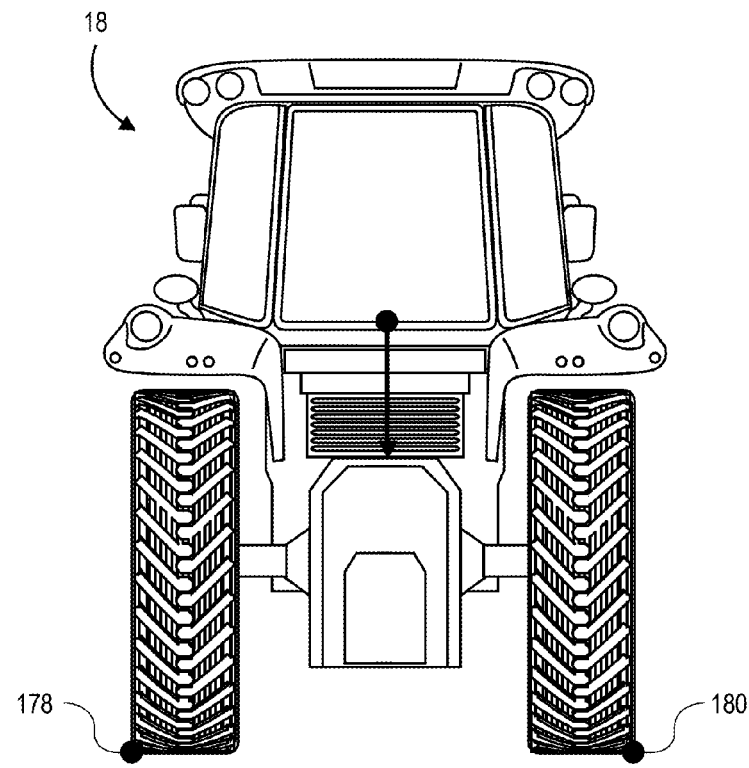
Figure 16B:
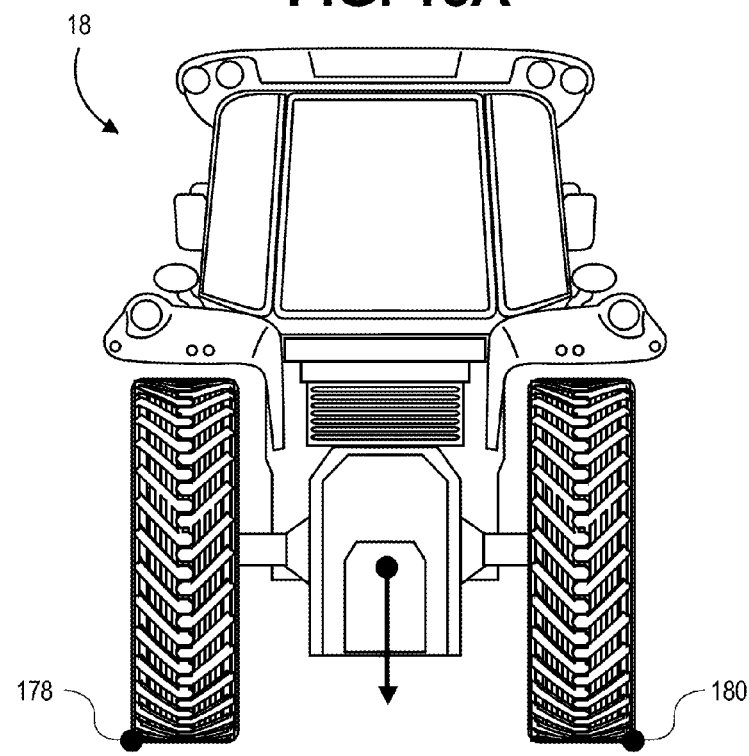

FIGS. 16A-B illustrate different positions of a center of gravity of a tractor corresponding to different positions of an implement associated with the tractor.

Figure 17A:
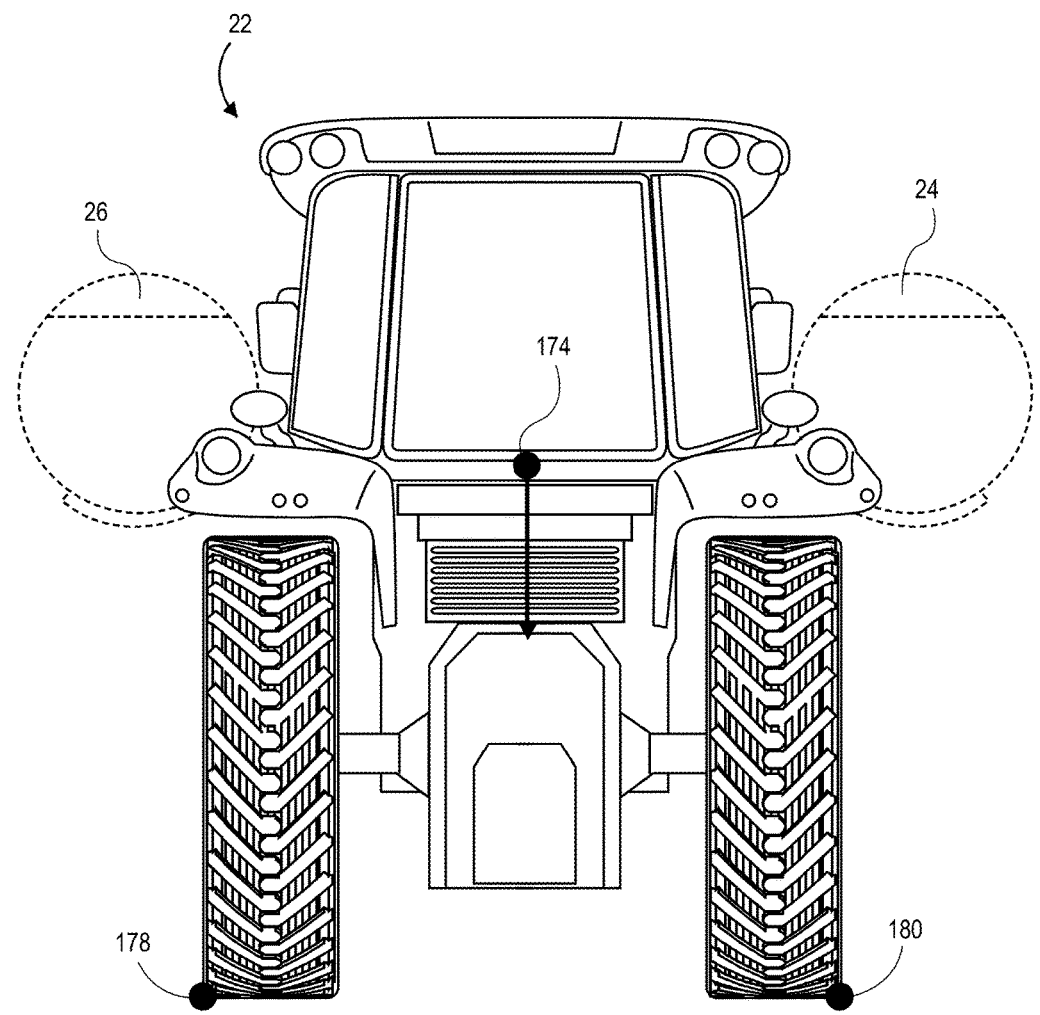
Figure 17B:
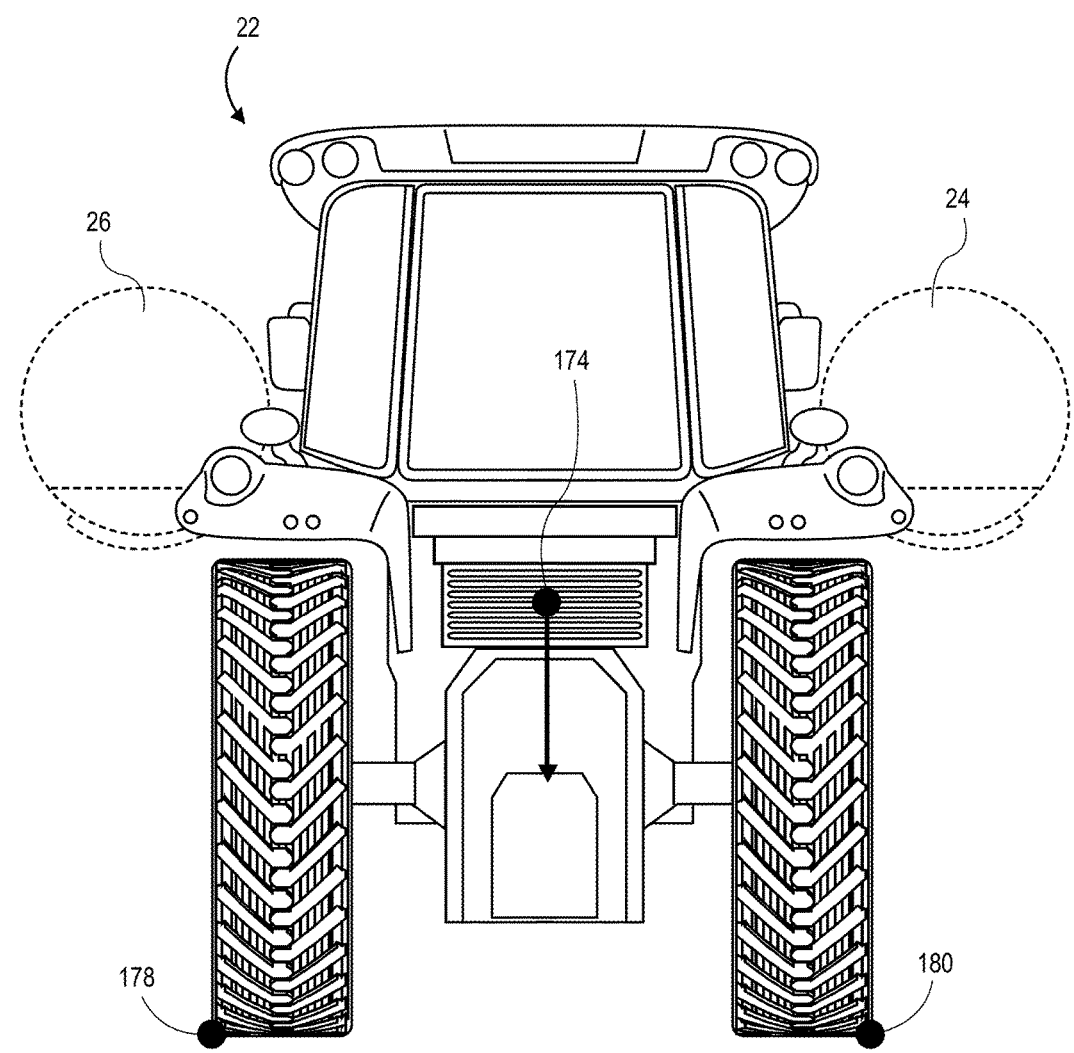
Figure 17C:
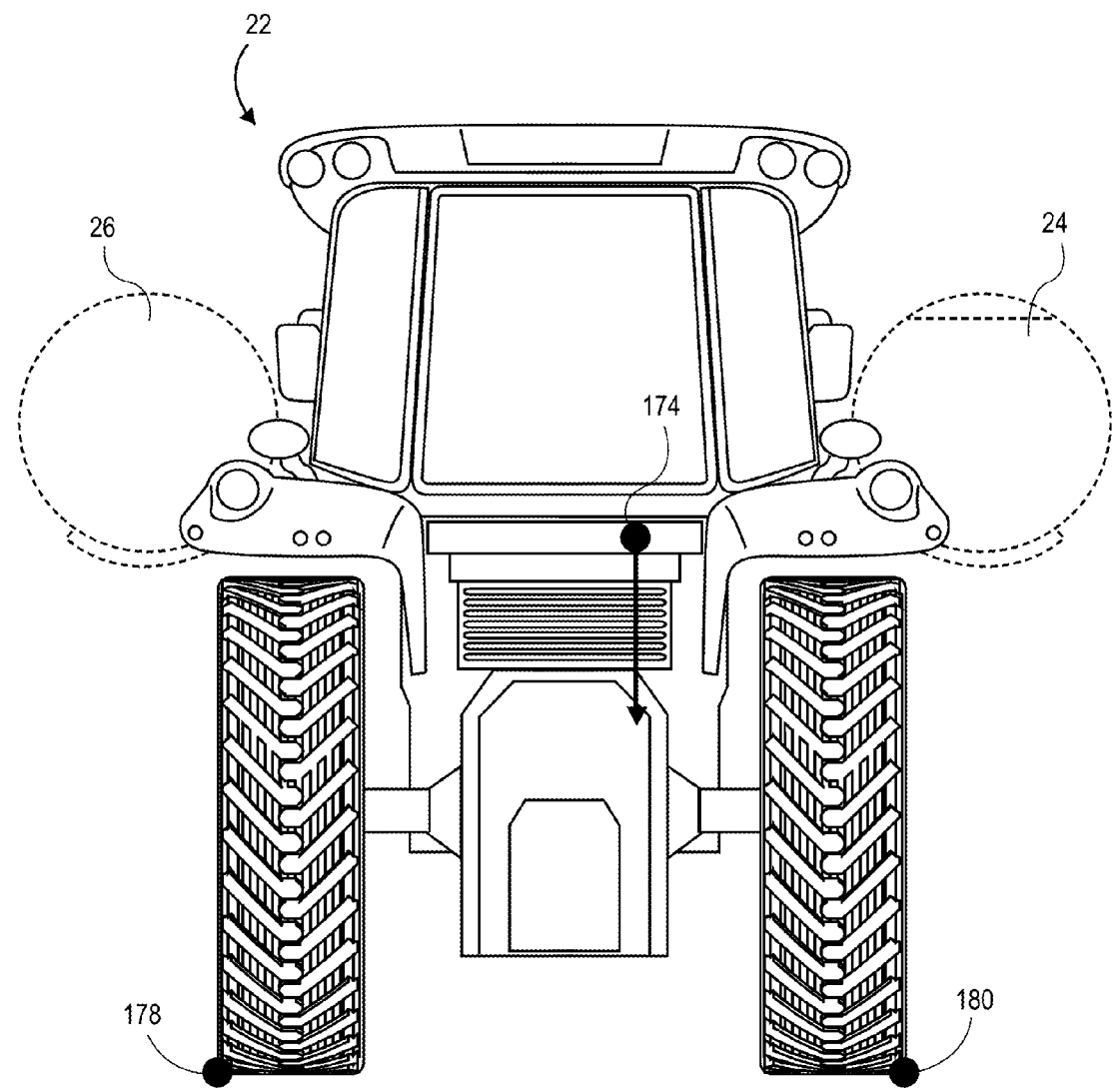

FIGS. 17A-C illustrate different positions of a center of gravity of a tractor corresponding to different fill levels of tanks mounted on the tractor.

Figure 18B:
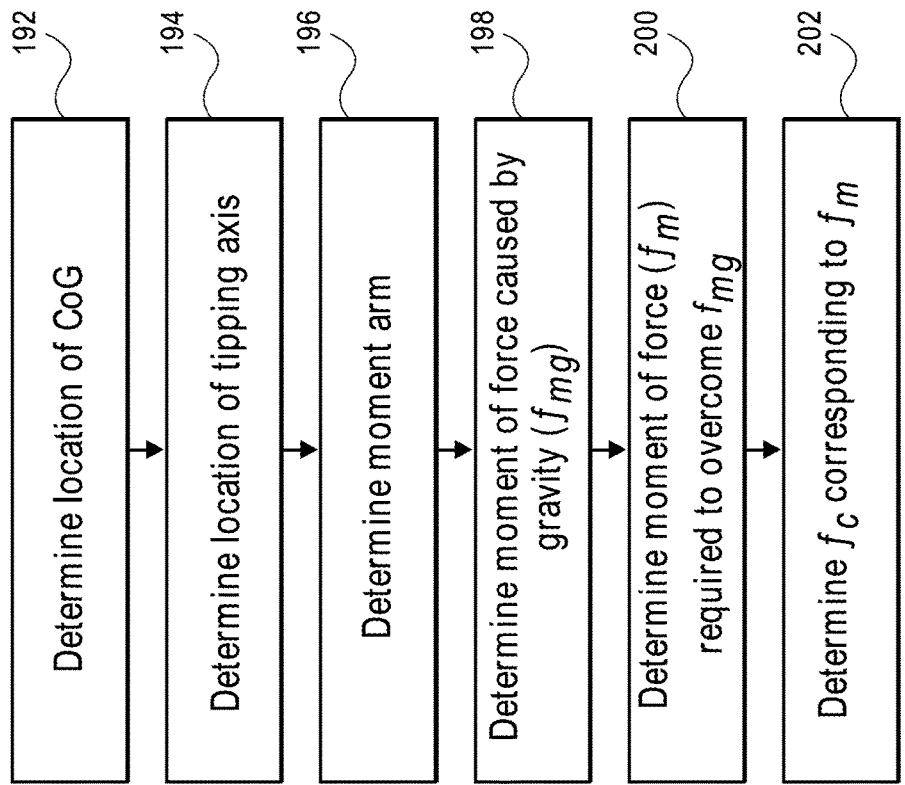
Figure 18A:
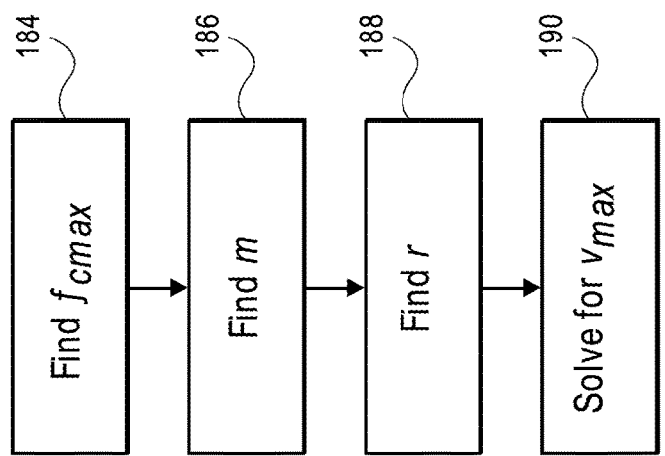

FIGS. 18A-B are flow diagrams illustrating exemplary steps of methods of the present invention.

Figure 19:
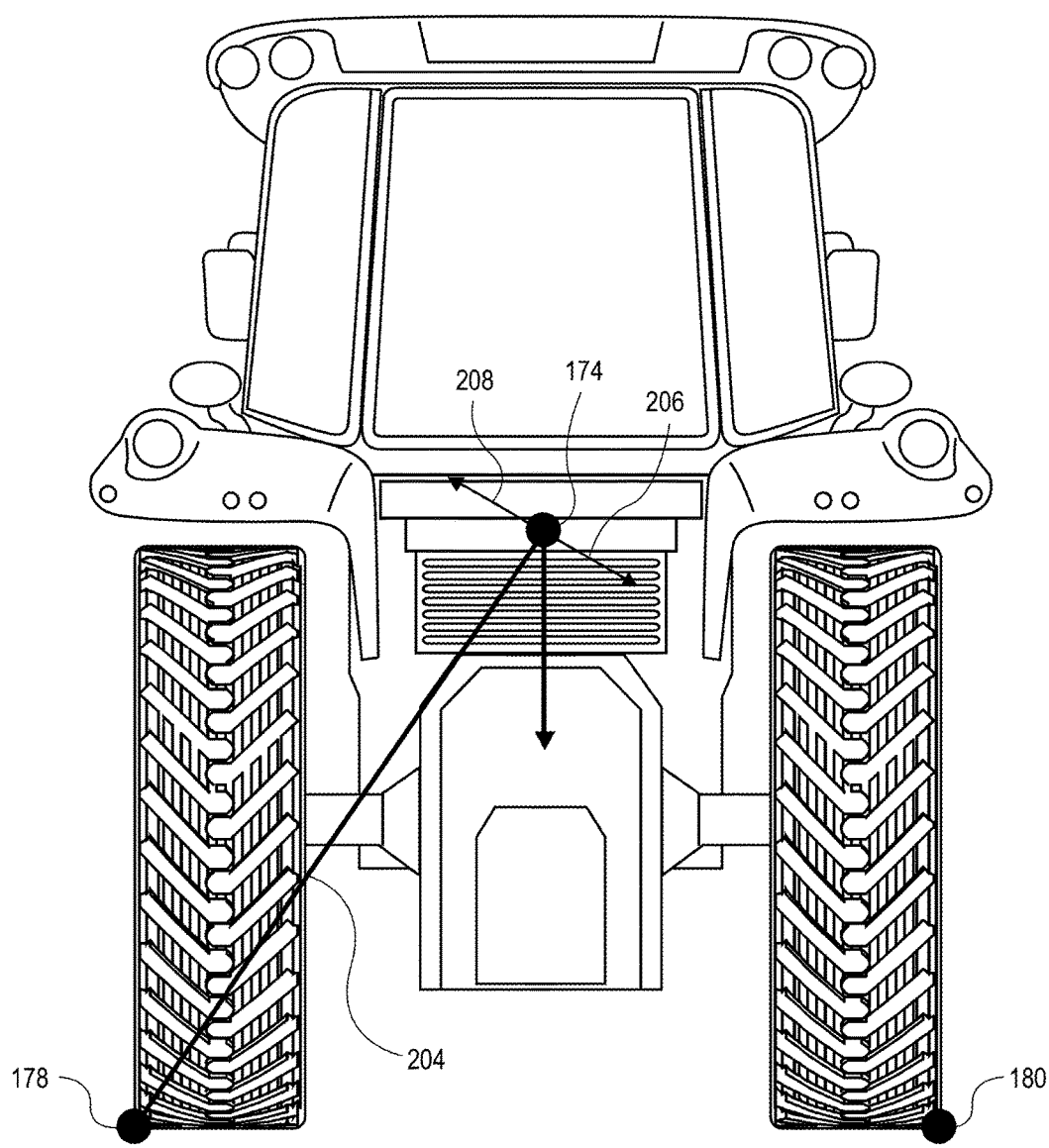

FIG. 19 is a rear elevation view of a tractor illustrating a moment arm associated with the tractor.

Figure 20:
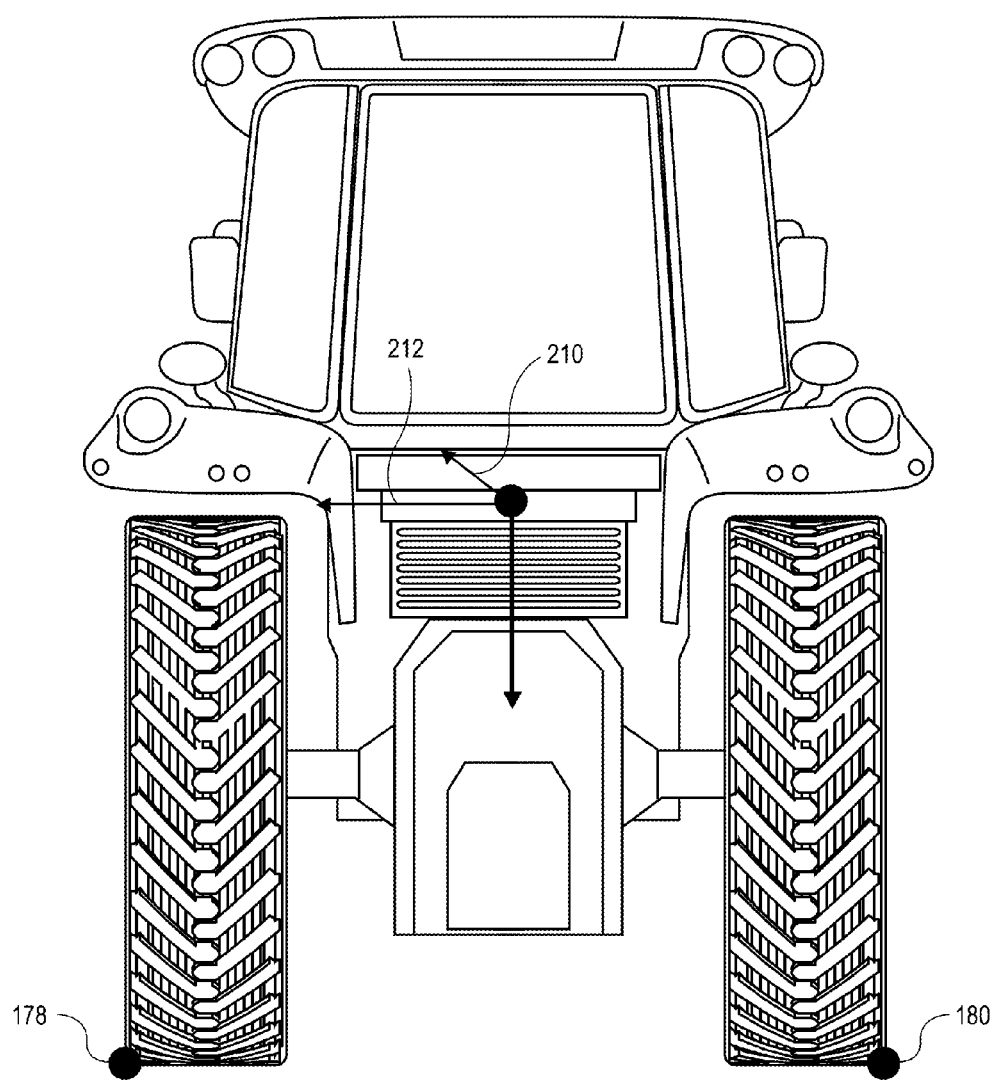

FIG. 20 is a rear elevation view of the tractor of FIG. 19 illustrating characteristics of centrifugal force acting on the tractor.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following description is, therefore, not to be taken in a limiting sense.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
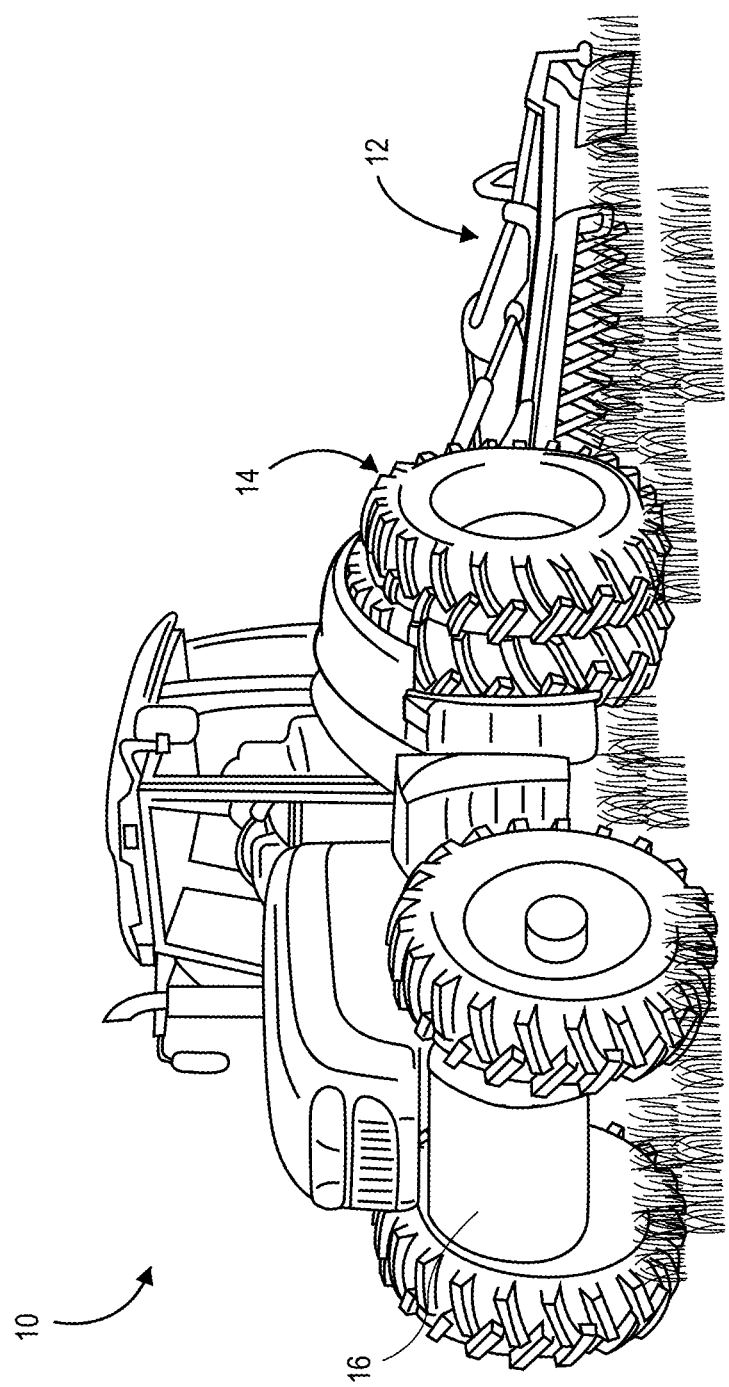
FIG. 1 is a first exemplary tractor and implement for use with embodiments of the present invention.

Embodiments of the present invention relate to control systems for mobile machines that manage machine operation during turn maneuvers to, for example, optimize machine performance. The invention may be implemented on virtually any mobile machine including machines used in the agriculture and construction industries. Various exemplary mobile machines that may be used with the present invention are illustrated in FIGS. 1-4. A first tractor 10 is illustrated in FIG. 1 attached to an implement 12. The tractor 10 and implement 12 may be used to prepare a field for agricultural production, for example, or may be used to work a ground surface in a construction area. The illustrated tractor 10 has dual rear wheels 14 (two wheels on each side of the tractor), but in some implementations the tractor 10 may be operated with single rear wheels (one wheel on each side of the tractor). One of the rear wheels 14 on each side may be removed to thereby convert the tractor 10 from a dual wheel configuration to a single wheel configuration. It may be desirable to convert the tractor 10 from a dual wheel configuration to a single wheel configuration to perform some tasks, and then to convert the tractor 10 back to a dual wheel configuration to perform other tasks. The tractor 10 may include one or more weights or systems of weights, such as weights 16 mounted on a front end of the tractor 10, weights mounted on two or more wheels (not illustrated), or both.

The implement 12 may be attached to the tractor 10 by way of a drawbar, for example, or by way of a hitch system such as a three point hitch system. The implement 12 may be adjustable between an engaged position and a retracted position. When in the retracted position the implement 12 may be self-supporting wherein it rests on wheels, or it may be carried by the tractor 10 wherein it is fully supported by, for example, the tractor's three point hitch system. While the illustrated implement 12 is used for tillage, other pulled or mounted implements may be used and are within the ambit of the present invention including, without limitation, harvesting, seeding and spraying implements.

Figure 2:
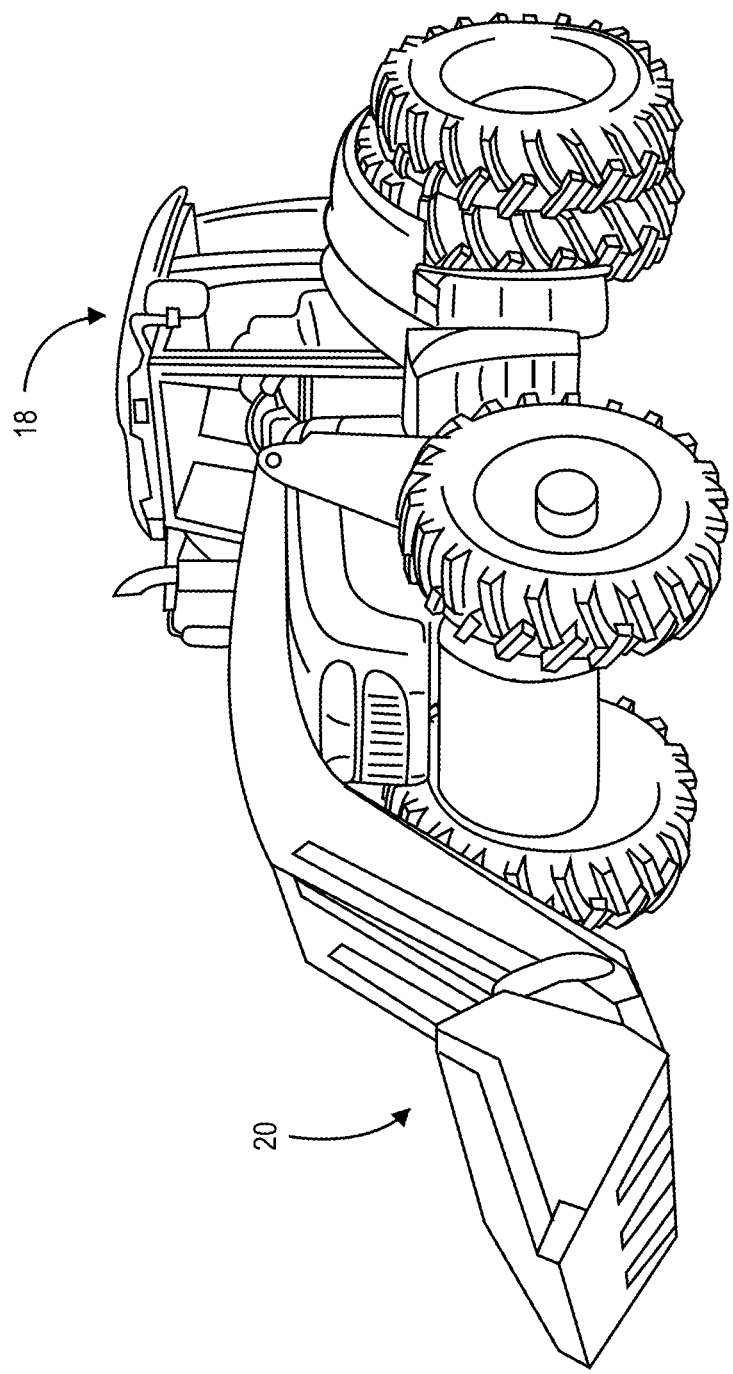
FIG. 2 is a second exemplary tractor and implement for use with embodiments of the present invention.

In some embodiments, the mobile machine may include a front- or side-mounted implement. A second tractor 18 is illustrated in FIG. 2, for example, with a front-end loader 20 mounted thereon. The loader 20 extends forward of a front portion of the tractor 18 and is moveable between various raised, lowered and articulated positions. Other examples of front-mounted implements include mowing and swathing implements, tillage implements, blades and bale carriers.

Figure 3:
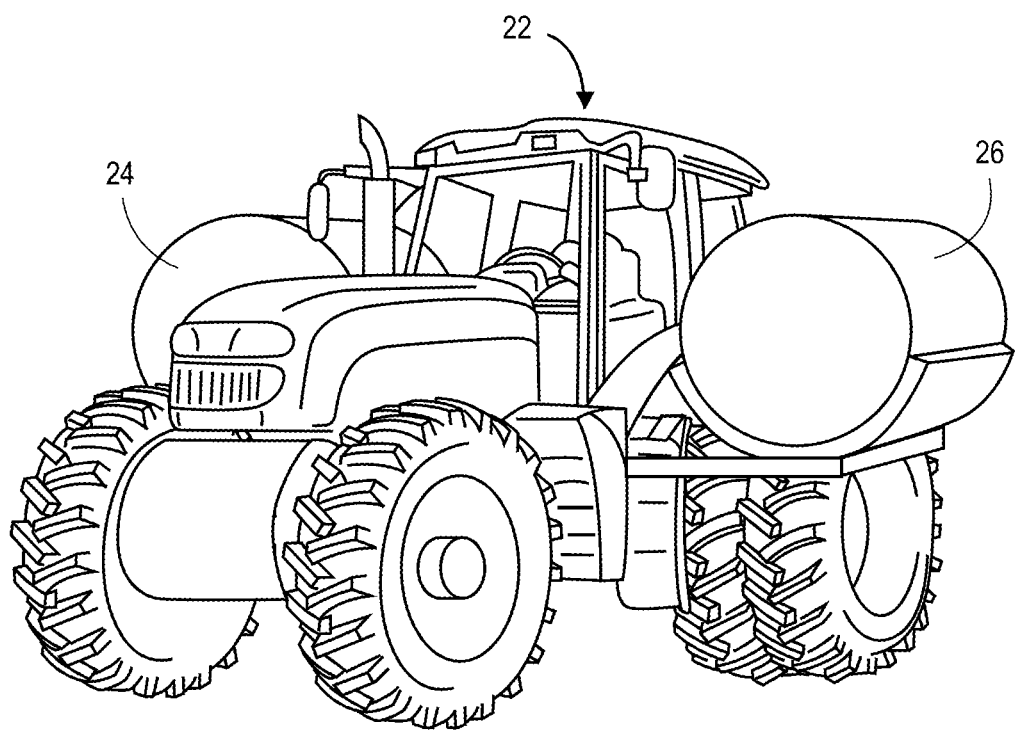
FIG. 3 is a third exemplary tractor and implement for use with embodiments of the present invention.

A third tractor 22 is illustrated in FIG. 3 with a pair of tanks 24, 26 mounted on opposite sides of the tractor 22. The tanks 24, 26 may be used, for example, to carry fertilizer or herbicide during a spraying operation. The fluid in the tanks may present a substantial amount of weight, particularly with larger tanks. During operation the tanks 24, 26 may contain various amounts of fluid and the amount of fluid in each tank may change during operation. Both tanks 24, 26 may be full or nearly full at the beginning of an operation, for example, and gradually empty as the contents of the tanks are applied during the operation. Furthermore, one tank may contain more fluid than the other tank. Alternatively or additionally, tanks may be mounted on the front of the tractor 22, the rear of the tractor 22, or both.

Figure 4:
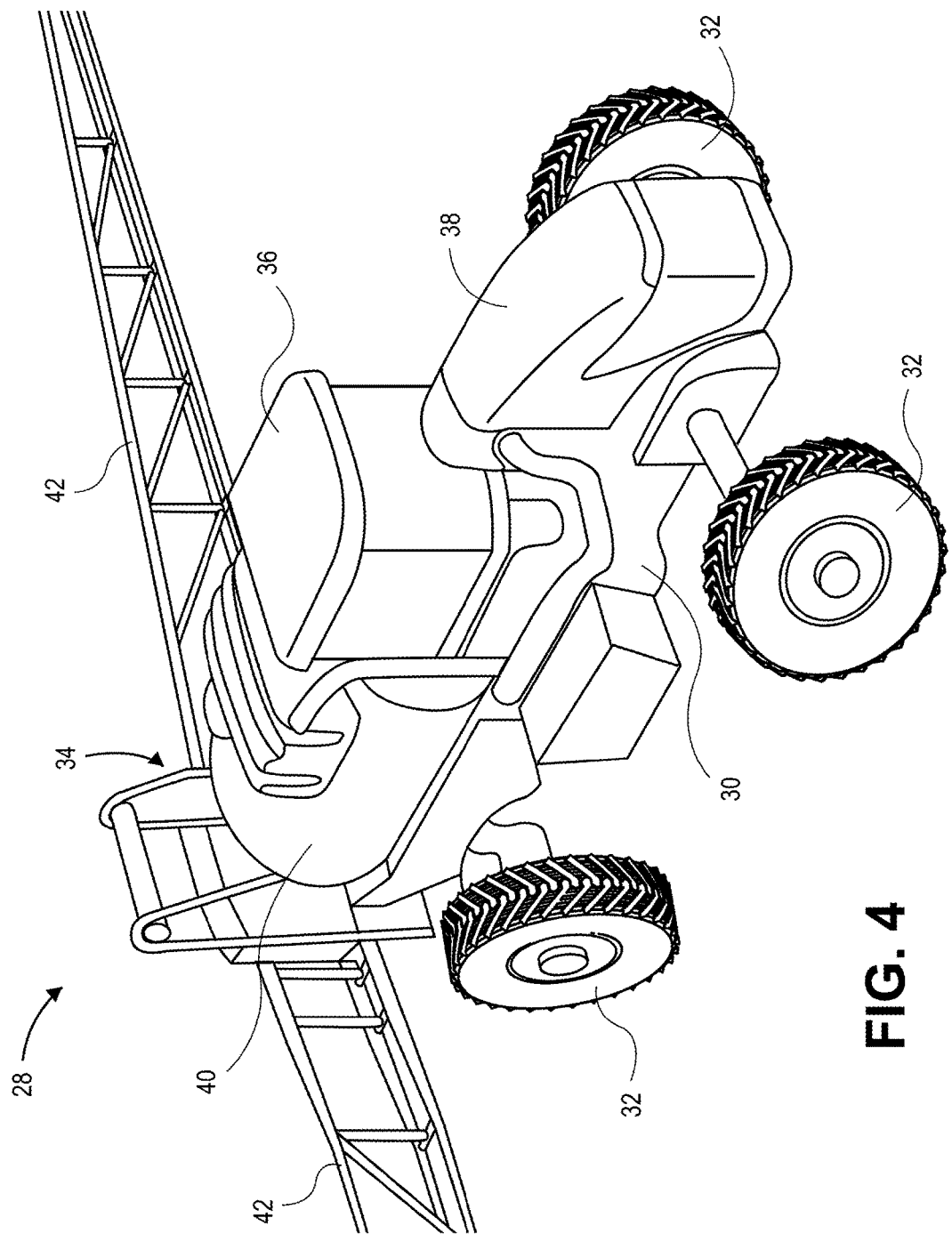
FIG. 4 is an exemplary applicator for use with embodiments of the present invention.

An applicator 28 is illustrated in FIG. 4. The applicator 28 broadly includes a chassis 30, a plurality of wheels 32 or other ground engaging elements supporting the chassis 30 above a ground surface, an application system 34, an operator cabin 36, and an engine compartment 38. The application system 34 includes a tank 40 for holding a liquid chemical that is dispersed through a series of conduits and spray nozzles supported by a pair of booms 42. The booms 42 may be moved between retracted and extended positions. The tank 40 may be any of various capacities ranging from one hundred gallons or fewer to more than one thousand gallons.

The applicator 28 is configured to apply products to a field surface or to crops and may be adjustable to accommodate different conditions, such as different types and growth stages of crops. By way of example, the height of the booms 42, the height of the vehicle chassis 30, or both may be adjustable to accommodate crops of different heights or to apply product directly to a ground surface. Alternatively or additionally, the positions of the applicator's wheels 32 may be moved to adjust the lateral distance of separation between the wheels 32 to accommodate, for example, different crop row spacing or widths.

The machines illustrated in FIGS. 1-4 are exemplary in nature and it will be understood that the present invention may be used with other mobile machines not specifically depicted in the drawings. Furthermore, the implements associated with the machines illustrated in FIGS. 1-4 are exemplary in nature and it will be understood that other implements may be used. By way of example, embodiments of the invention may be used with tracked tractors, graders, scrapers and bulldozers.

Figure 5:
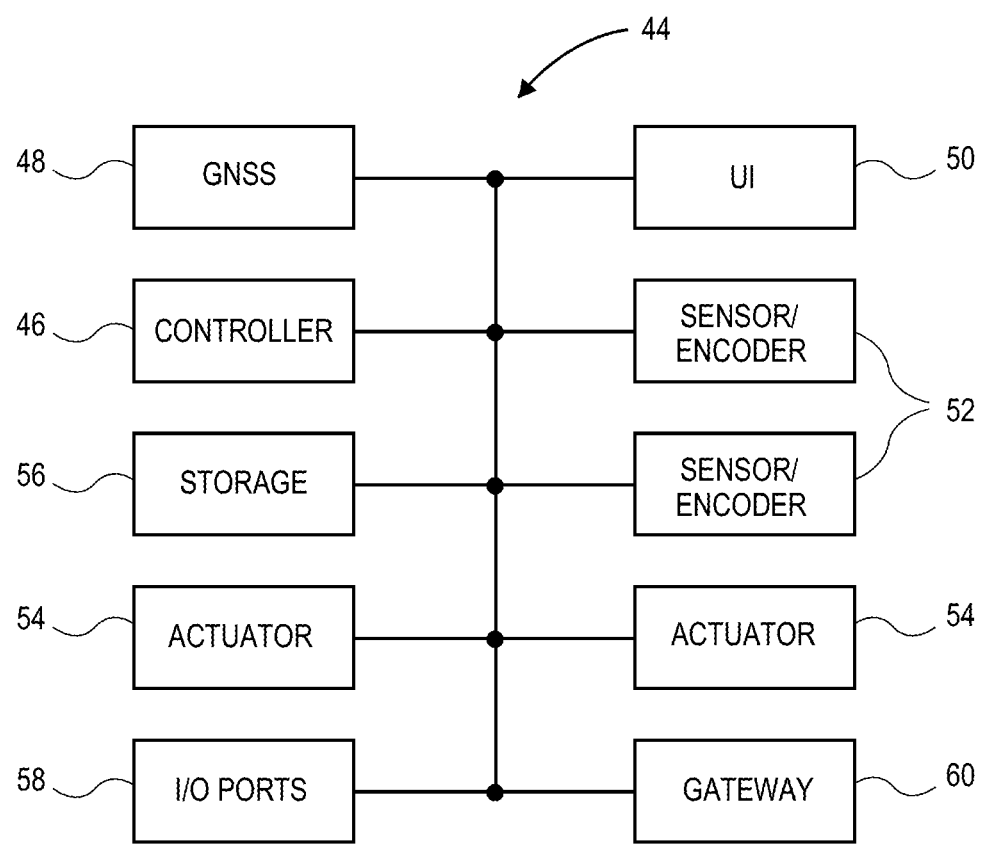
FIG. 5 is a block diagram of various components of an exemplary electronic system associated with a mobile machine and which may be used to implement aspects of the present invention.

Certain aspects of the present invention can be implemented by or with the assistance of an electronic system, such as a control and communications system associated with a mobile machine. More specifically, aspects of the present invention may be implemented by or with the assistance of an electronic system of a mobile machine used in the agriculture and/or construction industries. Such machines may include tractors (such as, for example, any of the tractors illustrated in FIGS. 1-3), applicators (such as, for example, the sprayer illustrated in FIG. 4), harvesters, graders or scrapers. Various components of an exemplary electronic system 44 are illustrated in FIG. 5. The system 44 may be or include, for example, an automated guidance system configured to drive the associated machine without operator input. The system 44 broadly includes a controller 46, a position determining device 48, a user interface 50, one or more sensors/encoders 52, one or more actuators 54, one or more storage components 56, one or more input/out ports 58 and a gateway 60.

The position determining device 48 may be a global navigation satellite system (GNSS) receiver, such as a device configured to receive signals from one or more positioning systems such as the United States' global positioning system (GPS) and/or the Russian GLONASS system, and to determine a location of the machine using the received signals. The user interface 50 includes components for receiving instructions or other input from a user and may include buttons, switches, dials, and microphones, as well as components for presenting information or data to users, such as displays, light-emitting diodes, audio speakers and so forth. The user interface 50 may include a touchscreen display capable of presenting visual representations of information or data and receiving instructions or input from the user via a single display surface.

The sensors/encoders 52 collect data relating to machine state, environmental or ambient conditions, or both. The sensors/encoders 52 may be associated with any of various components or functions of an associated machine including, for example, various elements of the engine(s), transmission(s), and hydraulic and electrical systems. The actuators 54 are configured and placed to drive certain functions of the machine including, for example, steering when an automated guidance function is engaged. The actuators 54 may take virtually any form but are generally configured to receive control signals or instructions from the controller 46 (or other component of the system 44) and to generate a mechanical movement or action in response to the control signals or instructions. By way of example, the sensors/encoders 52 and actuators 54 may be used in automated steering (or other automated operation) of a machine wherein the sensors/encoders 52 detect a current position or state of steered wheels or tracks and the actuators 54 drive steering action or operation of the wheels or tracks. Unless otherwise noted, the term "sensor" as used herein refers to sensors, encoders and similar devices.

The controller 46 includes one or more integrated circuits programmed or configured to implement the functions described herein. By way of example the controller 46 may be a digital controller and may include one or more general purpose microprocessors or microcontrollers, programmable logic devices, or application specific integrated circuits. The controller 46 may include multiple computing components placed in various different locations on the machine. The controller 46 may also include one or more discrete and/or analog circuit components operating in conjunction with the one or more integrated circuits or computing components. Furthermore, the controller 46 may include or have access to one or more memory elements operable to store executable instructions, data, or both. The storage device 56 stores data and preferably includes a non-volatile storage medium such as optic, magnetic or solid state technology.

It will be appreciated that, for illustration, certain elements and components of the system 44 have been omitted from the present discussion and from the drawing of FIG. 5. A power source or power connector is also associated with the system 44, for example, but is conventional in nature and, therefore, is not discussed herein.

Figure 8:
FIG. 8 is a block diagram of a system including at least one component in a mobile machine in communication with a remote computing device.

In some embodiments, all of the components of the system 44 are contained on or in a host machine. The present invention is not so limited, however, and in other embodiments one or more of the components of the system 44 may be external to the machine. In one embodiment, for example, some of the components of the system 44 are contained on or in the machine while other components of the system are contained on or in an implement associated with the machine. In that embodiment, the components associated with the machine and the components associated with the implement may communicate via wired or wireless communications according to a local area network such as, for example, a controller area network. The system 44 may be part of a communications and control system conforming to the ISO 11783 (also referred to as "ISOBUS") standard, as explained. In yet another exemplary embodiment, one or more components of the system 44 may be located remotely from the machine and any implements associated with the machine, as illustrated in FIG. 8. In that embodiment, the system 44 may include wireless communications components (e.g., the gateway 60) for enabling the machine to communicate with a remote computing device, computer network or system.

Figure 6:
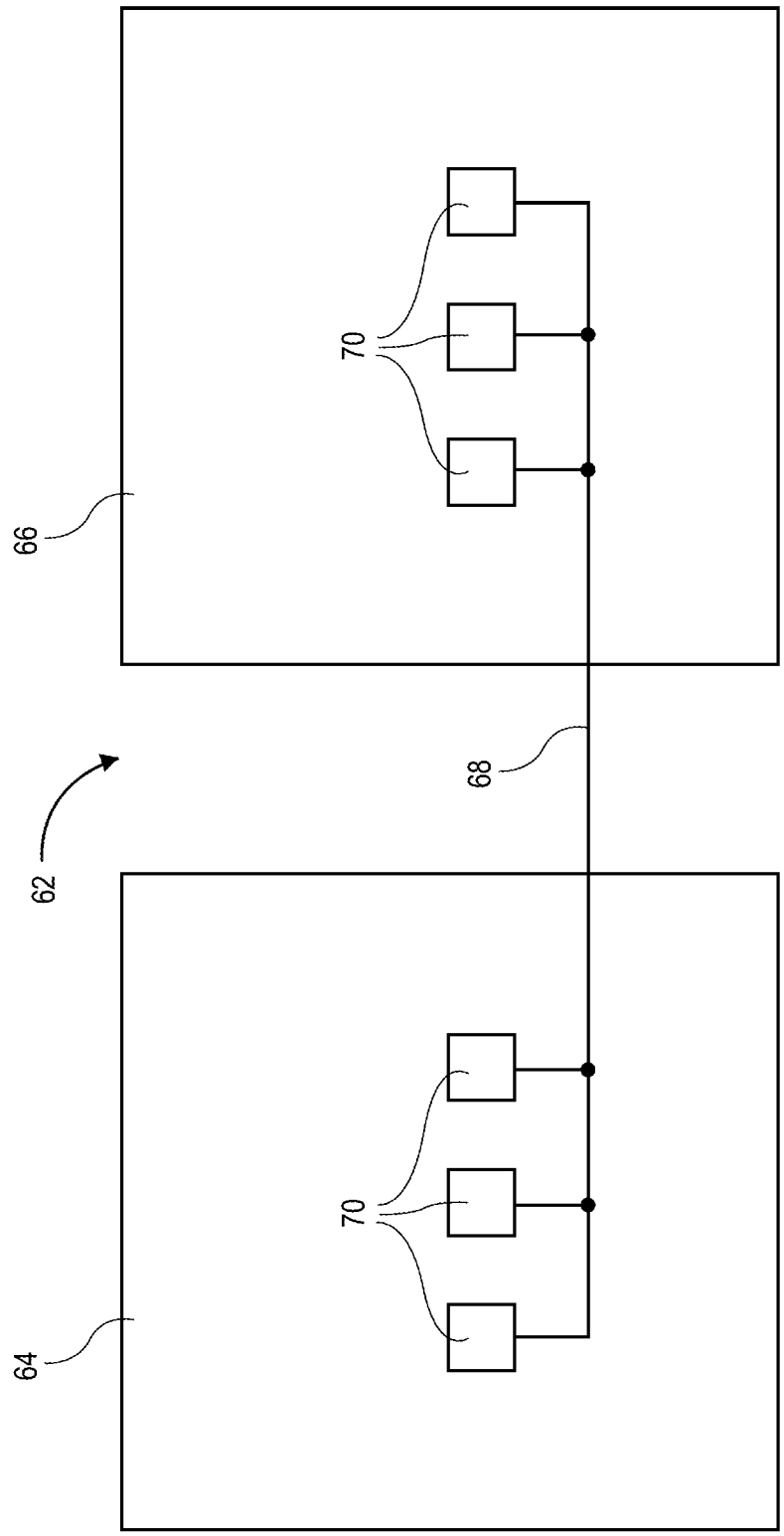
FIG. 6 is a block diagram of an exemplary electronic system spanning a mobile machine and an implement associated with the mobile machine.

A block diagram of another exemplary machine communication and control system 62 is illustrated in FIG. 6. The exemplary communication and control system 62 spans both a propelled machine 64 and an implement 66 associated with the machine 64, enabling communication and control between components of the machine 64, between components of the implement 66, between components of the machine 64 and components of the implement 66, and/or between components of two or more implements. It will be appreciated that the communication and control system 62 may be associated with only one machine, such as only a tractor, or may be associated with more than two machines, such as a tractor and two or more implements mounted on or connected to the tractor.

The system 62 includes a communications medium 68 and a plurality of components 70 communicatively coupled via the communications medium 68. The communications medium 68 may include one or more physical media through which signals are propagated or otherwise communicated according to protocols governing the exchange of information between components. By way of example, the communications medium 68 may include wired and/or wireless transmission paths configured to carry signals between the components 70, such as electromagnetic signals. The communications medium 68 may include a data bus configured to communicate digital or analog signals in serial or parallel format according to any of various protocols, including protocols associated with proprietary or open standards. Specifically, in some embodiments the system 62 conforms to the ISO 11783 standard, discussed below.

The components 70 communicatively coupled with the communications medium 68 may include, without limitation, controllers, display devices, sensors and actuators. By way of example, one or more of the components 70 may be associated with the tractor engine, one or more of the components may be associated with the tractor transmission, one or more of the components may be associated with the tractor dashboard, and one or more of the components may be associated with the tractor hydraulic system. Similarly, one or more of the components 70 may be associated with each of various functions and/or components of an implement associated with the tractor. If the implement is a planter, for example, one or more of the components 70 may be associated with a seed flow sensor or other element of each row unit.

Figure 7:
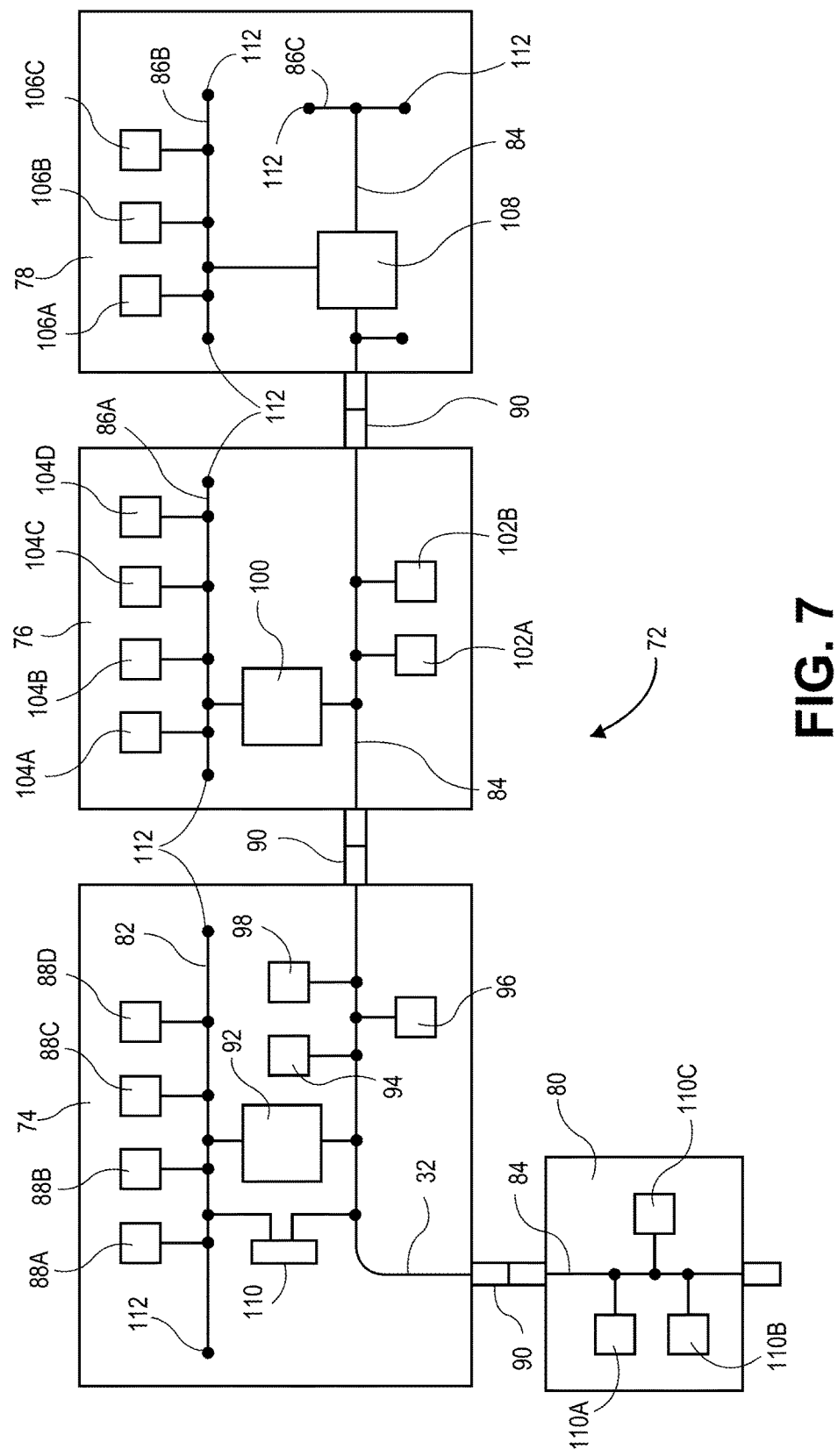
FIG. 7 is a block diagram of an exemplary electronic system of a mobile machine and an implement associated with the mobile machine.

With reference to FIG. 7, another exemplary machine control and communications system 72 is illustrated in greater detail. The communication and control system 72 conforms to the International Standard Organization's ISO 11783 standard, also referred to herein as the "Isobus standard" or simply "Isobus." The Isobus standard is designed to enable the electrical systems of different agricultural machines to interact, regardless of the type of machine or the manufacturer. More specifically, Isobus standardizes the method and format of data transfer between sensors, actuators, control elements, and information storage and information display units, whether mounted on, or part of, a tractor or one or more implements. In use, when the operator of an Isobus-enabled tractor attaches an Isobus-enabled implement such as a sprayer or seeder to the tractor, the operator establishes an Isobus connection by physically attaching a connector of the implement to a connector of the tractor. Once the physical connection is established, the electrical systems of both machines automatically begin exchanging communication and control information. During operation the tractor may communicate speed information to the implement, for example, and the implement may communicate performance and status information to the tractor for presentation to the operator via a virtual terminal.

The Isobus standard defines various aspects of the control and communication system including physical interconnections, network communication layers and network management, messaging, a task controller, diagnostics and even a standardized computer file server. Isobus uses a shared wiring concept that allows tractor and implement controllers to efficiently communicate over a single pair of wires, reducing the complexity of the system and the risk of failure. Isobus systems do not use a centralized controller, but rather allow multiple controllers (called electronic control units or "ECUs") to access the bus simultaneously, using a prioritized transmission process to grant access to the bus. All networked electronics can be diagnosed through one connection to the bus.

Isobus systems may use the Controller Area Network (CAN) protocol defined in the ISO 11898 standard for physical and data link layer communications. The CAN protocol allows multiple controllers within a machine or system to communicate with each other without the need for a host computer or other single master controller. Devices attached to a CAN network typically include sensors, actuators and other control devices. Such devices may include a host processor and a CAN controller connected to a CAN communications bus.

In the illustrated embodiment, the system 72 is associated with a self-propelled tractor 74 or other self-propelled machine and a plurality of implements 76, 78, 80 associated with the tractor 74, including two rear-mounted or towed implements 76, 78 and a front- or side-mounted implement 80. Isobus generally supports two network segments, including a tractor network 82 and an implement network 84, that can each include one or more subnetworks 86. As used herein, the term "tractor" broadly refers to the main power unit of a system and, therefore, may be a tractor according to the conventional meaning of the word or may be another machine that serves as the main power unit of a system. By way of example, a combine harvester pulling a grain wagon or other machine may be a "tractor" in an Isobus-enabled system.

The tractor network 82 provides the control and data communications for the drive train and chassis of the tractor 74 and connects to components 88 associated with the engine, the transmission, brakes and a hitch controller. The particular components and implementation details of the tractor network 82 are typically determined by the tractor manufacturer. The implement network 84 enables control and data communications between two or more implements and between the tractor and one or more implements. The implement network 84 spans the tractor 74 as well as the plurality of implements 76, 78, 80 and may be interconnected between the tractor and the various implements via breakaway connectors 90. Both the tractor network 82 and a portion of the implement network 84 may be built into the tractor's systems by the original manufacturer. A tractor ECU 92 is part of both the tractor network 82 and the implement network 84 and provides electrical and logical/message isolation between the two networks. By way of example, the tractor ECU 92 receives and interprets requests from the implement network 84 and communicates with one or more ECUs on the tractor network 82 to respond to the requests. Each implement 76, 78, 80 provides connections for extending the implement network 84 to additional implements that would be connected in a serial manner. The portion of the implement network 84 implemented on the tractor may also include a virtual terminal device 94, a management computer gateway 96 and a task controller 98.

The virtual terminal device 94 provides an operator interface for the tractor 74 and any implements connected to the tractor 74 using standardized control and messaging associated with the Isobus network. In the illustrated embodiment, the virtual terminal device 94 is connected to the implement network 84 on the tractor 74, but the tractor ECU 92 and other ECUs in the tractor 74 that are connected to the tractor network 82 can also access and use the virtual terminal 94. When an Isobus-compliant implement is connected to the tractor 74, the virtual terminal device 94 detects the presence of the implement and downloads virtual terminal data unique to that implement from an ECU on board the implement. The virtual terminal device 94 uses the virtual terminal data to generate a touchscreen with buttons, tabs, indicators and/or other elements associated with the implement. Each implement may provide its own virtual terminal data, and if multiple implements are connected to the Isobus system the operator may toggle a display of the device 94 between the various implements. Each Isobus-ready implement includes all of the data needed to operate its various functions electronically using an Isobus-compliant terminal in the cabin of the tractor 74. By way of example, an operator may raise and lower the pickup on a bailer or forage wagon using the virtual terminal 94, or may open and close the hopper slides on a fertilizer spreader.

Isobus virtual terminals have a common display format—they use the same style to show an implement's settings, they are adjusted in the same way and the graphical representation of various functions has the same look and feel on every terminal. Virtual terminals for a fertilizer spreader and a forage wagon will have different functional content, for example, but they are similar enough in look, feel and structure that an operator with experience operating one will feel comfortable operating the other with little or no preparation or instruction. The device 94 may be portable such that it may be moved from one machine to another.

The task controller 98 enables scheduled control of implement functions via the Isobus network. Task data received via the management computer gateway 96 is stored in the task controller 98, which then schedules the tasks and sends control messages to the appropriate control function for execution on the implement network 84. The task controller 98 also records data received from the control functions as tasks are being completed. This data is communicated back to a farm management computer through the management computer gateway 96. Thus, the management computer gateway 96 provides an interconnection between the Isobus system and the external farm management computer.

The implement 76 includes a portion of the implement network 84 and a subnetwork 86a interconnected via a network interconnect unit 100. Each of the implement network 84 and the implement subnetwork 86a includes a plurality of ECUs and/or other components 102, 104. The network interconnect unit 100 may be required to maintain network electrical load limits if the subnetwork 86a includes a large number of nodes. The implement 78 also includes a portion of the implement network 84, an Isobus subnetwork 86b with associated components 106 (e.g., ECUs, lighting controllers, etcetera), and a second subnetwork 86c associated with a different standard, both connected to the implement network 84 via a network interconnect unit 108. Thus, the network interconnect unit 108 may be used to isolate and bridge network segments with different architectures. The implement 80 includes a plurality of ECUs or other components 110 connected to the implement network 84.

The system 72 may further include a diagnostic connector 110 and a plurality of bus terminators 112. Other components, such as a power source or connector, are not illustrated. Many aspects of Isobus systems are determined by machine manufacturers and will vary from one system to another.

In an exemplary scenario, a tractor and a sprayer are Isobus-enabled. The tractor and the sprayer may be made by different manufacturers, but when the sprayer is connected to the tractor's Isobus system the sprayer's virtual terminal appears on the virtual terminal 94. The operator can then read flow meters, change rates and operate control valves via the virtual terminal inside the tractor's cab. The operator can also raise or lower spray boom sections, turn sections of the boom on and off, and map the spray application using a GNSS-enabled device.

The control and communications system 72 is an example of an Isobus-compliant system that may form part of and/or may be used by embodiments of the present invention. The control and communications system 72 may vary substantially from one embodiment of the invention to another, and may or may not be Isobus compliant, without departing from the spirit or scope of the invention.

Embodiments of the invention include a machine control system for a mobile machine wherein the control system is configured to determine an optimal speed for a turn maneuver between segments of an operating path of the mobile machine. The turn maneuver may include, for example, a turn performed by an agricultural machine in a headland area of a field or a turn performed by a construction machine between consecutive segments of an operating path in a construction work area. The optimal speed may be a maximum speed at which the machine can safely traverse the turn maneuver.

The machine control system may be similar or identical to any of the systems 44, 62, 72 described above, wherein one or more computing devices, such as the controller 46 or the ECU 92, are configured to perform the functions described herein. Alternatively, the machine control system may include one or more remote computing devices 114 in communication with the mobile machine, as illustrated in FIG. 8. The one or more remote computing devices 114 perform, or assist one or more local computing devices in performing, the computing necessary to support the functions described herein. The one or more remote computing devices 114 may be in communication with the mobile machine by, for example, the Internet via a cellular or satellite communications link. Hereinafter specific reference will be made to the communications and control system 44 with the understanding that other communications and control systems, including system 62 and system 72, may be used.

The one or more computing devices may include or be in communication with a machine-readable storage medium, such as a storage medium associated with the storage device 56, having instructions stored thereon which, when executed by the one or more computing devices, cause the one or more computing devices to perform the operations described herein. The machine-readable storage medium may be on the mobile machine, may be at a remote location for use with remote computing devices, or both. The machine-readable storage medium may be or may include a portable data storage device, such as a portable flash drive or hard disk drive. A portable data storage device may be loaded with data at a location remote from the mobile machine, such as at an office, and physically carried to the mobile machine where the device is connected to the mobile machine and the data on the device is accessed and used by one or more computing devices on the mobile machine.

For simplicity, embodiments of the invention will be described herein as being implemented by or with the assistance of "a computing device" or "the computing device," with the understanding that the invention may be implemented by or with the assistance of one or more computing devices located on the mobile machine, located remotely from the mobile machine, or both.

The computing device may use information relating to a turn radius associated with a turn maneuver, machine characteristics, machine state, external factors, or a combination thereof to determine an optimal speed (or optimal speeds) of the mobile machine as it travels through the turn maneuver, as explained below.

Figure 9:
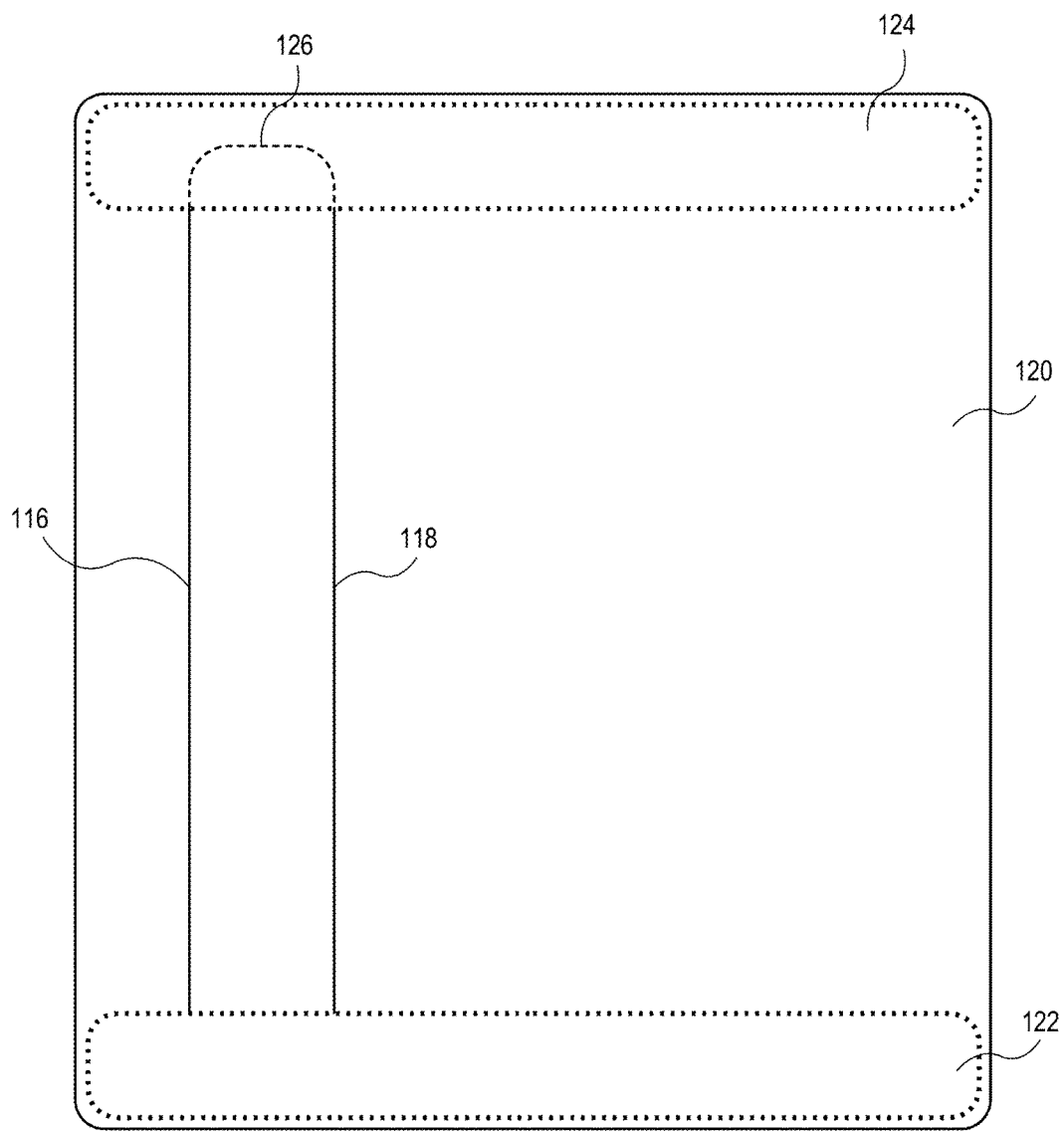
FIG. 9 illustrates exemplary working path segments in a field and headland areas where turn maneuvers are executed.

The computing device is configured to determine an optimal speed for a turn maneuver between segments of an operating path of the mobile machine. The computing device may be part of an automated guidance system and may define a plurality of working path segments in a field, construction zone or other work area. Various exemplary turn maneuvers are illustrated in FIGS. 9-11. The working path segments may be linear, curved or both, and may include a plurality of parallel path segments, such as the path segments illustrated in FIGS. 9, 10A-10C, 10G and 11, and/or may include a plurality of non-parallel path segments, such as the path segments illustrated in FIGS. 10D-F. The computing device may determine multiple path segments simultaneously or may progressively determine one path segment after another, such as where the computing device determines a path segment immediately prior to travelling that path segment.

A first exemplary scenario is illustrated in FIG. 9 which may correspond to a machine in the process of working an area by travelling parallel working path segments 116, 118 through a work area 120. The machine uses headland areas 122, 124 located at opposing margins of the work area 120 to reverse direction after completing each pass and in preparation for beginning a subsequent pass. As illustrated, the machine completes a first pass along working path segment 116 and travels through a turn maneuver 126 to begin a subsequent pass along working path segment 118.

Figure 10F:
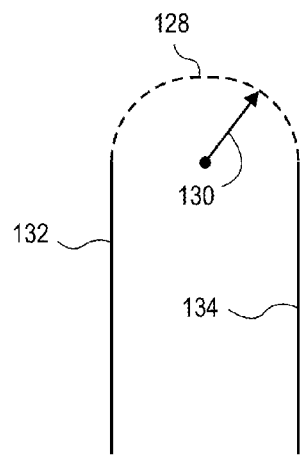
Figure 10F:
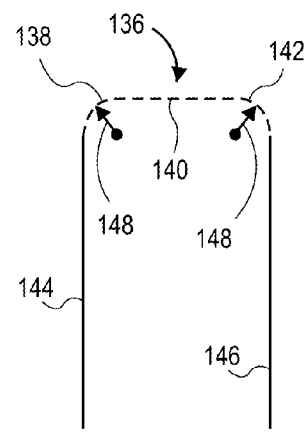
Figure 10F:
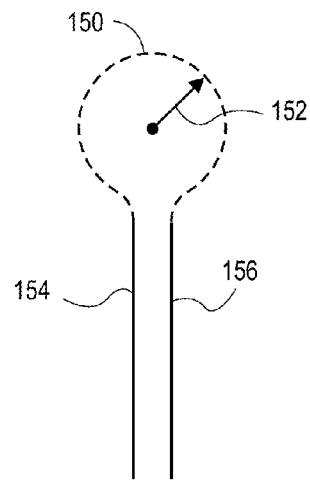
Figure 10F:
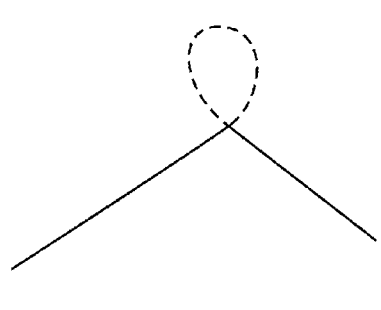
Figure 10F:
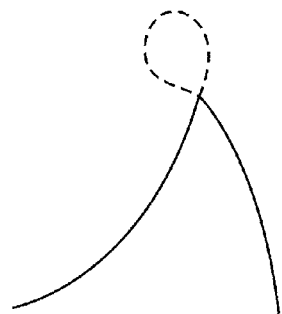
Figure 10F:

Other exemplary scenarios are illustrated in FIGS. 10A-10G. The scenarios illustrated in FIGS. 10A-10C are similar to the scenario illustrated in FIG. 9 and illustrate some variations in the turn maneuver used to reverse or change direction. A simple turn maneuver following path 128 is illustrated in FIG. 10A wherein the turn maneuver comprises a turn following a curved path 128 with a constant (or nearly constant) radius of curvature 130 executed between working path segments 132, 134. FIG. 10B illustrates a scenario similar to that of FIG. 10A except that the turn maneuver follows a path 136 that is more squared and is defined by a first curved segment 138, a straight segment 140, and a second curved segment 142. This turn maneuver may be desirable where the working path segments 144, 146 are separated by a relatively large distance, where the headland area limits maneuverability, or both. The curved segments 138, 142 are defined by radii of curvature 148 that may be smaller than the radius of curvature 130 associated with the path 128.

FIG. 10C illustrates a turn maneuver involving following a curved path 150 presenting a radius of curvature 152 that exceeds the distance between the first working path segment 154 and the second working path segment 156. This type of maneuver, also referred to as a "key-hole turn," may be used to allow the machine to make the turn between relatively close working path segments without reversing direction.

In other scenarios the turn maneuver may involve transitioning between non-parallel working path segments, as illustrated in FIGS. 10D-10F. This may occur, for example, where the working path segments define a contoured path following generally the shape of the outer boundaries of a field. The working path segments illustrated in FIGS. 10D and 10E, for example, intersect at points such that the turn maneuver is required to avoid missing a portion of at least one of the working path segments. In both of these scenarios the turn maneuver follows a path presenting a roughly circular or elliptical shape. In the scenario illustrated in FIG. 10F, a turn maneuver is executed between two non-parallel paths that do not intersect, such that the turn maneuver comprises only a simple turn between the path segments.

Figure 10G:
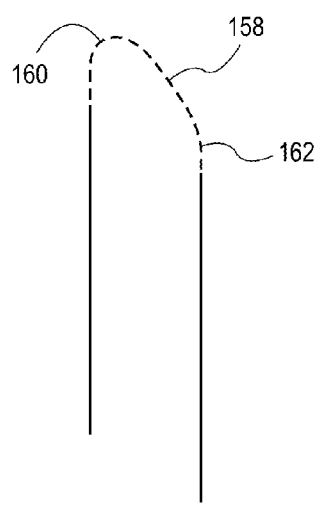

In some instances a turn maneuver may involve multiple curved segments wherein a first curved segment presents a radius of curvature that is different than the radius of curvature of a second curved segment. FIG. 10G presents one such scenario wherein the turn maneuver follows a path 158 including a first curved segment 160 and a second curved segment 162, wherein the first curved segment 160 presents a smaller radius of curvature than the second curved segment 162. Where a turn maneuver includes multiple curved segments of varying radii the maximum speed at which the machine may safely travel through the turn maneuver may be different for each curved segment. As explained below, the computing device may assign a single turn maneuver speed corresponding to the lowest safe speed for the various segments of the path 158, or may assign different speeds to different segments of the turn maneuver.

External factors may influence the maximum safe speed at which a turn maneuver may be executed. Some turn maneuvers may be executed on uneven terrain, as illustrated in FIG. 11. The turn maneuver illustrated in FIG. 11 follows a U-shaped path 164 between parallel working path segments 166, 168 wherein the path 164 crosses sloping terrain represented by contour lines 170. Each of the contour lines 170 represents a different surface altitude such that the first line 170A is at a higher altitude than the second line 170B, the second line 170B is at a higher altitude than the third line 170C, and the third line 170C is at a higher altitude than the fourth line 170D. As explained below, the slope of the surface may affect the speed at which the machine may safely travel through the turn maneuver.

To execute a turn maneuver, the operator may disable the machine guidance system to manually steer the machine through the turn maneuver, or the machine guidance system may determine the turn maneuver and automatically guide the machine through the turn maneuver without operator input. Alternatively, the computing device may determine a proposed turn maneuver and present information relating to the proposed turn maneuver to the machine operator via, for example, a graphical user interface. The information may include, for example, a definition of a travel path in the turn maneuver or a speed associated with the turn maneuver.

In some situations turn maneuvers performed between path segments may represent a significant portion of the time needed to work a field. If the machine is operating in the work area by following parallel path segments, for example, the machine may need to perform a turn maneuver after completing each path segment. A similar situation exists where the machine is following overlapping path segments or repeatedly passing over the same path segments. The amount of time dedicated to the turn maneuvers increases if the machine must slow down to perform each maneuver. Thus, the speed at which the machine travels through each turn maneuver can substantially impact the total time needed to complete operations in a particular work area, and reducing the time required to perform each turn maneuver can reduce the amount of time and fuel required to complete work in a work area.

For these reasons, it is desirable to maximize the speed of the machine in the turn maneuvers to thereby minimize the amount of time required to complete operations in the work area. Increasing machine speed may present risks, however. If a machine traverses a turn at too great a speed, the machine may tilt or even completely roll over, thereby damaging the machine, damaging implements attached to the machine, and/or injuring the operator. The maximum speed at which a mobile machine can safely travel along a curved path depends, at least in part, on the radius of curvature of the path. Generally, the larger the radius of curvature the faster a machine can safely travel through the curve. Therefore, in order to traverse a turn maneuver at or near a maximum speed the computing device may set the machine's speed to approximate a maximum speed associated with the radius of curvature of a curve associated with the turn maneuver.

Each turn maneuver may be unique and may depend on such things as the proximity of the first path segment to the second path segment, the angle of the first path segment relative to the second path segment, the area available for the turn maneuver, geographic features in the vicinity, and so forth. Furthermore, external factors such as an angle of slope on which the turn maneuver will be executed may vary from one turn to another, even within the same working area. The computing device may determine a unique optimal speed for each turn maneuver taking into account one or more variables including turn radius, external factors, machine characteristics and machine state.

The computing device may use any of various methods to determine or calculate an optimal speed for each turn maneuver. In a first example, the computing device determines an optimal speed for a turn maneuver by matching a turn radius with a predetermined maximum speed associated with that turn radius, such as by using a look-up table of turn radii and a corresponding maximum speed associated with each turn radius. In this example, each maximum speed value may be predetermined by a machine manufacturer or a machine operator, may be associated with a single turn radius and may be based on the assumption that the machine is not carrying an implement. Alternatively, each maximum speed value may be associated with a combination of a mobile machine in combination with an implement associated with the machine.

In another example, the computing device determines an optimal turn speed by performing calculations using variables associated with machine characteristics, machine state, and/or external factors, as explained below. The computing device may calculate a single speed for an entire turn maneuver or may associate a different speed with each of several portions of a turn maneuver. Moreover, the computing device may determine the optimal speed (or speeds) entirely before performing the turn maneuver, or may dynamically determine an optimal speed while traveling through the turn maneuver. In some embodiments, the machine may repeatedly or continuously calculate an optimal speed, taking into account changes in such variables as machine state as the machine travels through the turn maneuver. In such scenarios, the machine control system may adjust the actual travel speed of the machine to match the calculated optimal speed in real time or near real time.

Assigning an optimal speed to a turn maneuver (or to a portion of a turn maneuver) may involve avoiding a turn speed at which the machine may tilt or roll over. Several factors may influence when and how a machine may tip, roll over or otherwise be subject to damaging centrifugal forces when travelling a curved path. Such factors may include, without limitation, the location of the machine's tipping axes, the location of the machine's center of gravity, and the slope or grade of the surface on which the machine is operating.

With reference to FIG. 12, a tractor 172 is shown illustrating exemplary locations of a center of gravity 174 and tipping axes 178, 180 of the tractor 172. A line 176 indicates the direction of force of gravity relative to the center of gravity 174 and intersects the center of gravity 174 of the tractor 172. A tipping axis is a line or axis about which the tractor 172 will pivot when tipping. The tipping axes of a machine typically correspond to portions of the machine that contact the ground at or near peripheral portions of the machine on the sides, front and rear of the machine. Two exemplary tipping axes 178, 180 corresponding to the lateral sides of the tractor 172 are illustrated in FIG. 12 and generally run parallel with a longitudinal axis of the tractor—although it will be appreciated that for some machines the configuration of the suspension and of the front axle may affect the location and the orientation of the tipping axis. For purposes of illustration, it will be assumed in the present discussion that the tipping axis of the machine generally corresponds to an outermost lower edge of a rear wheel or of a track of the machine and is parallel with a longitudinal axis of the machine.

The location of the center of gravity relative to the tipping axes affects the propensity of the machine for tipping. If a line intersecting the center of gravity and running parallel with the force of gravity (e.g., the line 176) passes to the outside of a tipping axis (sometimes referred to as "breaching" the tipping axis), the machine will roll over unless a contravening force acts to reverse the tipping action of the machine. Generally, a machine with a higher center of gravity must pivot less and requires less lateral force to breach a tipping axis than a similar machine with a lower center of gravity. This is illustrated in FIG. 13, wherein a tractor is shown in various positions of a rollover sequence.

In a first position 182A the tractor is in a normal, upright position. In a second position 182B the tractor is tilted a first distance, but the center of gravity has not breached the tipping axis 180. In a third position 182C the tractor has tilted a second distance wherein the center of gravity 174 has breached the tipping axis 180. At this point the tractor will completely roll over onto its side (182D) unless a contravening force acts to move the tractor toward an upright position.

FIGS. 14 and 15 illustrate how the position of the center of gravity may affect the propensity of a machine to tip or roll over. In FIG. 14 a tractor is illustrated on an inclined surface with a gravity line through the center of gravity being separated from the tipping axis 180 by a first distance D1. In FIG. 15 the tractor is illustrated on the same inclined surface with the gravity line through the center of gravity being separated from the tipping axis by a first distance D2. The center of gravity on the tractor in FIG. 15 is located higher on the machine than the center of gravity on the tractor of FIG. 14, reducing the perpendicular distance between the center of gravity and tipping axis. Thus, the tractor in FIG. 15 need rotate or tip about the tipping axis 180 less than the tractor in FIG. 14 before the center of gravity breaches the tipping axis. The center of gravity of the tractor may change during operation, such as where a position of an implement mounted on the tractor changes or where the fill level of a tank on the tractor changes. As the center of gravity of the tractor changes during operation, the tractor may become more or less prone to tipping and rolling.

The center of gravity of the machine may be affected by machine characteristics such as the presence or absence of implements carried by the machine, or by weights attached to various locations of the machine. The center of gravity of the machine may also be affected by machine state including shifting or changing loads carried by the machine, by movement of an implement carried by the machine, and so forth. If the machine is a tractor with a front-end loader as illustrated in FIG. 2, for example, the position of the loader will affect the location of the machine's center of gravity. When the loader is in a raised position the center of gravity of the machine would be higher, as illustrated in FIG. 16A, and when the loader is in a lowered position the center of gravity of the machine would be lower, as illustrated in FIG. 16B.

If the machine is a tractor with side-mounted tanks, such as the tractor 22 illustrated in FIG. 3, the contents of the tanks 24, 26 can affect the position of the center of the gravity, as illustrated in FIGS. 17A, 17B and 17C. The fill level of the tanks 24, 26 may affect the vertical and lateral position of the center of the gravity 174. If both tanks 24, 26 are full or near full (FIG. 17A) the center of gravity 174 of the machine may be higher than if the tanks 24, 26 are empty or near empty (FIG. 17B). If one of the tanks 24, 26 contains a greater amount of contents than other tank (FIG. 17C) the center of gravity 174 may be shifted toward the tank with the greater amount of contents.

In another implementation, if the machine is a sprayer or other applicator, a full chemical tank adds significant weight at a relatively high position of the machine, thereby causing the center of gravity to be higher than it would be on the same machine with an empty tank. During operation the tank is gradually depleted, thereby causing the center of gravity of the machine to slowly move from a higher position corresponding to a full tank to a lower position corresponding to an empty tank. Other exemplary factors determining the center of gravity of a sprayer include the chassis height where the chassis may be raised or lowered, and the height of the spray booms where the spray booms may be raised or lowered.

Thus, the center of gravity of the machine may vary depending on the state of the machine as well as the state of any implements carried by the machine. Furthermore, the center of gravity of the machine may gradually change during operation as the state of the machine gradually changes, such as where a load is gradually depleted or gradually increases.

The computing device may use information relating to the state and characteristics of the machine, of an implement associated with the machine, or both when determining an optimal speed for a turn maneuver. The machine characteristics may include a rating provided by the machine manufacturer or a third party providing a maximum speed at each of various turn radii. The maximum speed at each of the turn radii may be related to, for example, the center of gravity and the overall width of a machine. The information may be stored in the form of a look-up table, for example, or may be expressed as a mathematical function or algorithm. By way of example, when the computing device receives or determines the turn maneuver, it identifies at least one turn radius and applies the turn radius to the lookup table or to the mathematical function to thereby determine the maximum speed at which the turn maneuver can safely be negotiated.

The location of the tipping axes may change according to the state of the machine. By way of example, the state of the machine may include the position of the wheels where the wheels may be adjusted laterally relative to a chassis of the machine, the presence or absence of an outer wheel of a dual wheel pair, and/or the presence or absence of one or more weights or systems of weights.

Machine status data may be collected automatically by sensors or encoders in communication with a controller, may be submitted by a user via a user interface, or a combination of both. A tractor may include sensors for detecting the position of a front end loader, for example, or a pulled implement such as a baler may include sensors for detecting the fill status of the baler. Alternatively or additionally, a user may submit machine status information to the computing device via a user interface, such as where the user indicates whether or not weights are present on the machine or a second wheel is mounted on each side of the rear axle of the vehicle.

In addition to machine characteristics and machine state, the computing device may use external factors when determining an optimal speed at which the machine may travel through a turn maneuver. At the location of each of the turns and each portion of the turn. Slope may be identified beforehand using a topographical map, or in real time using orientation sensors (helpful because a topographical map may not include certain small features that affect the orientation of the machine), or both.

The computing device may determine the optimal speed at which the machine may travel through a turn maneuver by assessing the centrifugal force acting on the machine during the turn maneuver. The maximum amount of centrifugal force a machine can be safely subject to without resulting in a rollover depends on such factors as location of the center of gravity, the location of the machine's tipping axes, and the slope of the surface on which the machine is operating, as explained above.

The centrifugal force is an outward force exerted on a machine that is travelling a curved path. If the centrifugal force is sufficiently strong it can cause the machine to pivot about its tipping axis, for example on its outside wheels or tracks (that is, the wheels nearest the outside of the curved path). If the centrifugal force is sufficiently strong it may cause the machine to pivot on its outside wheels beyond the tipping point. Centrifugal force $f_c$ may be defined as:

$$f_c = \frac{v^2}{r} \times m \quad (1)$$

where v is the speed of the machine, r is the radius of curvature of the path followed by the machine, and m is the mass of the machine. The mass of the machine is an example of a machine characteristic that may be used by the computing device to determine the maximum speed of the machine through a turn maneuver and may be a fixed value known or estimated. The mass of the machine and a maximum safe centrifugal force ($f_{cmax}$) may be treated as constants so that the maximum speed depends only on the radius r.

An exemplary method of finding an optimal speed v for traversing the turn maneuver is illustrated in FIG. 18A. Applying the equation (1) set forth above, the maximum speed is a function of a maximum safe centrifugal force ($f_{cmax}$), the mass m of the machine and the minimum turn radius r of the turn maneuver. First, the maximum safe centrifugal force $f_{cmax}$ is determined, as depicted in block 184, taking into consideration such factors as the slope of the surface on which the machine is operating, the location of the machine's center of gravity, and the location of the machine's tipping axis, as explained above.

When the maximum safe centrifugal force $f_{cmax}$ is determined the computing device may then find the mass m of the machine, as depicted in block 186. The computing device finds m by, for example retrieving it from a data storage device. The computing device then finds the minimum turning radius r of the machine, as depicted in block 188. Once the computing device has determined $f_{cmax}$, m and r, the computing device solves for the maximum safe speed $v_{max}$ at which the machine may negotiate the turn maneuver, as depicted in block 190. In some implementations, both the maximum safe centrifugal force $f_{cmax}$ and the mass m of the machine may be predetermined and stored, such that the minimum turn radius r of the turn maneuver is the only variable necessary to solve for the maximum speed v.

An exemplary method of determining $f_{cmax}$ is illustrated in FIG. 18B. First the location of the center of gravity is determined, as depicted in block 192. The center of gravity may be predetermined and retrieved by the computing device, or may be determined based on the state of the machine. The location of the tipping axis is then located, as depicted in block 194. The location of the relevant tipping axis will depend on the direction of centrifugal force applied to the machine, which depends on the direction of the machine's turn. Thus, determining the location of the tipping axis may involve selecting one tipping axis from a plurality of tipping axes.

The moment arm is then determined, as depicted in block 196. The moment arm 204 corresponds to a line connecting the center of gravity 174 with the tipping axis, as illustrated in FIG. 19. The moment of force caused by gravity ($f_{mg}$) is then determined, as depicted in block 198. The moment of force caused by gravity is the force of gravity that tends to resist tipping movement of the machine as illustrated by the arrow 206 in FIG. 19. When $f_{mg}$ is determined, the moment of force $f_m$ required to overcome $f_{mg}$ is then determined, as depicted in block 200. The moment of force $f_m$ will be equal and opposite $f_{mg}$, as depicted by line 208 in FIG. 19, and corresponds to the amount of force required to cause the machine to rotate about its tipping axis. If a component 210 (hereinafter referred to as $f_{ccomp}$) of the centrifugal force 212 corresponding to the same direction as $f_m$ 208 has the same magnitude as $f_m$, the machine will rotate about the tipping axis. Thus, the computing device may determine $f_{cmax}$ by determining a value of $f_{ccomp}$ equal to $f_{mg}$ and setting $f_{cmax}$ equal to $f_{ccomp}$.

The speed at which the mobile machine travels through the turn maneuver may be the maximum speed $f_{cmax}$ determined by the computing device. It may be preferred, however, to travel through the turn at a speed less than the calculated maximum as an added measure of safety. It may be desirable, for example, to determine the maximum speed and then travel through the turn at a speed equal to 90% or 95% of the maximum speed.

The maximum speed at which a machine may travel through a turn may vary according to the machine's position along the path of the turn. With reference to FIG. 11, a first portion of a turn maneuver may be on a sloped ground surface while a second portion of the turn maneuver may be on a flat ground surface. Each of the contour lines 170 in FIG. 11 represents a different surface altitude such that the first line is at a higher altitude than the second, the second line is at a higher altitude than the third, and the third line is at a higher altitude than the fourth line. The maximum speed at which the machine can travel through the first portion of the turn maneuver may be lower than the maximum speed at which the machine can travel through the second portion of the turn maneuver due to the slope and the fact that the machine is turning on the sloped surface.

The computing device may determine the different maximum speeds associated with each portion of the turn in advance using, for example, topographical map data stored in memory or accessed via a computer network. Additionally or alternatively, the computing device may sense an inclination of a ground surface over which the machine is travelling by sensing, for example, an orientation of the machine. The computing device may determine the optimal speed at each portion of the turn maneuver prior to beginning the turn maneuver or may determine the optimal speed as the machine travels through the turn maneuver by sensing the machine state (including the orientation of the machine). The computing device may use a combination of these two approaches by planning the turn maneuver speed, in whole or in part, before the machine begins the turn maneuver and then adjusting the turn machine's speed during the turn maneuver by based on sensed machine state.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A control system for a mobile machine, the control system comprising:
one or more sensors for generating machine state data; and
one or more computing devices configured to—
determine a first segment and a second segment of an operating path of the machine, the first segment and the second segment being consecutive segments of the operating path, and
use the machine state data to determine a first optimal speed for a first portion of a turn maneuver between the first segment and the second segment of the operating path and a second optimal speed for a second portion of the turn maneuver, the turn maneuver being a transition between the first segment and the second segment of the operating path and not forming a part of the operating path.

2. The control system as set forth in claim 1, the machine state data including data indicating a material fill level.

3. The control system as set forth in claim 1, the machine state data including data associated with the state of an implement associated with the mobile machine.

4. The control system as set forth in claim 3, the machine state data including data indicating the position of an implement mounted on the machine.

5. The control system as set forth in claim 1, the first optimal speed being based at least in part on a first turn radius and the second optimal speed being based at least in part on a second turn radius.

6. The control system as set forth in claim 1, the one or more computing devices further configured to adjust at least one of the optimal speeds of the mobile machine while the machine performs the turn maneuver.

7. The control system as set forth in claim 1, the one or more computing devices further configured to adjust at least one of the optimal speeds of the mobile machine while the machine performs the turn maneuver using sensed machine state data.

8. The control system as set forth in claim 7, the machine state data including an orientation of the machine.

9. A control system for a mobile machine, the control system comprising: one or more computing devices configured to—
determine a first optimal speed for a first portion of a turn maneuver between a first segment and a second segment of an operating path and a second optimal speed for a second portion of the turn maneuver, the first segment and the second segment being consecutive segments of the operating path, and the turn maneuver being a transition between the first segment and the second segment of the operating path and not forming a part of the operating path,
guide the machine through the turn maneuver at the optimal speeds,
determine an adjusted optimal speed while guiding the machine through the turn maneuver, and
adjust the speed of the machine during the turn maneuver to match the adjusted optimal speed.

10. The control system as set forth in claim 9, further comprising one or more sensors for generating machine state data, wherein the one or more computing devices are further configured to adjust at least one of the optimal speeds while guiding the machine through the turn maneuver using the machine state data.

11. The control system as set forth in claim 10, the machine state data including data indicating an orientation of the machine.

12. The control system as set forth in claim 11, the orientation of the machine including a tilt of the machine.

13. The control system as set forth in claim 10, the machine state data including data indicating a position of an implement mounted on the machine.

14. The control system as set forth in claim 9, further comprising one or more sensors for generating state data relating to an implement pulled by the machine, wherein the one or more computing devices are further configured to adjust at least one of the optimal speeds while guiding the machine through the turn maneuver using the state data.

15. The control system as set forth in claim 14, the state data including data indicating an orientation of the implement.

16. The control system as set forth in claim 15, the orientation of the implement including a lateral tilt of the implement.

17. A control system for a mobile machine, the control system comprising: one or more sensors for generating machine state data; and
one or more computing devices configured to—
determine a first segment and a second segment of an operating path of the machine, the first segment and the second segment being consecutive segments of the operating path,
determine a first optimal speed for a first portion of a turn maneuver between the first segment and the second segment of the operating path and a second optimal speed for a second portion of the turn maneuver, the optimal speed based at least in part on a state of the machine or a state of an implement pulled by the machine, the turn maneuver being a transition between the first segment and the second segment of the operating path and not forming a part of the operating path.

18. The control system as set forth in claim 17, the one or more computing devices configured to determine at least one of the optimal speeds for the turn maneuver based at least in part on an operating position of the implement pulled by the machine.

19. The control system a set forth in claim 17, the one or more computing devices configured to determine at least one of the optimal speeds for the turn maneuver based at least in part on a fill level of the implement pulled by the machine.

* * * * *